US012562156B2

(12) United States Patent
Choi et al.

(10) Patent No.: US 12,562,156 B2
(45) Date of Patent: Feb. 24, 2026

(54) ELECTRONIC DEVICE SUPPORTING SPEECH RECOGNITION AND OPERATING METHOD THEREOF

(71) Applicant: Samsung Electronics Co., Ltd., Suwon-si (KR)

(72) Inventors: Myeungyong Choi, Suwon-si (KR); Godawari Sudhakar Rao, Karnatak (IN); Ranjan Kumar Samal, Karnatak (IN); Dasom Kim, Suwon-si (KR); Hyuk Oh, Suwon-si (KR); Junkwon Choi, Suwon-si (KR); Priyadarshini Panemangalore Pai, Karnatak (IN); Rahul Kumar, Karnatak (IN); Vijeta Gour, Karnatak (IN); Sungjae Park, Suwon-si (KR); Seungbeom Ryu, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 146 days.

(21) Appl. No.: 18/357,594

(22) Filed: Jul. 24, 2023

(65) Prior Publication Data

US 2023/0368781 A1 Nov. 16, 2023

Related U.S. Application Data

(63) Continuation of application No. PCT/KR2022/001762, filed on Feb. 4, 2022.

(30) Foreign Application Priority Data

Feb. 4, 2021 (KR) ........................ 10-2021-0016321

(51) Int. Cl.
| | |
|---|---|
| *G10L 15/183* | (2013.01) |
| *G10L 15/05* | (2013.01) |
| *G10L 15/22* | (2006.01) |

(52) U.S. Cl.
CPC ............ *G10L 15/183* (2013.01); *G10L 15/05* (2013.01); *G10L 15/22* (2013.01); *G10L 2015/223* (2013.01); *G10L 2015/227* (2013.01)

(58) Field of Classification Search
CPC ....... G10L 15/183; G10L 15/05; G10L 15/22; G10L 2015/223; G10L 2015/227;
(Continued)

(56) References Cited

U.S. PATENT DOCUMENTS

| | | | |
|---|---|---|---|
| 9,666,192 B2* | 5/2017 | Fanty ...................... | G10L 15/01 |
| 10,121,471 B2 | 11/2018 | Hoffmeister et al. | |

(Continued)

FOREIGN PATENT DOCUMENTS

| | | |
|---|---|---|
| JP | 2019215513 A | 12/2019 |
| KR | 20060022156 A | 3/2006 |

(Continued)

OTHER PUBLICATIONS

International Search Report for PCT/KR2022/001762 mailed May 13, 2022, 5 pages.

(Continued)

*Primary Examiner* — Abul K Azad
(74) *Attorney, Agent, or Firm* — Nixon & Vanderhye P.C.

(57) ABSTRACT

Various embodiments of the disclosure relate to an apparatus for supporting automatic speech recognition in an electronic device capable of performing natural language processing, and an operating method thereof. To this end, based on one or more partial texts recognized sequentially from an audio signal input from a microphone, the electronic device may identify an utterance type for the input audio signal. The electronic device may adaptively determine a hangover time, based on the utterance type, and may detect an end of an utterance of the audio signal by applying the determined hangover time.

20 Claims, 22 Drawing Sheets

(58) Field of Classification Search

CPC ......... G10L 15/04; G10L 25/30; G10L 25/78;
G10L 25/87; G10L 15/26; G10L 15/28;
G06N 3/045; G06N 3/09; G06N 3/0464;
G06N 3/048; G06N 3/0442; G06N 20/00

See application file for complete search history.

(56) References Cited

U.S. PATENT DOCUMENTS

| | | | |
|---|---|---|---|
| 10,186,254 | B2 | 1/2019 | Williams et al. |
| 10,546,576 | B2 | 1/2020 | Buchanan et al. |
| 10,937,448 | B2 | 3/2021 | Li et al. |
| 11,211,048 | B2 | 12/2021 | Kim et al. |
| 11,430,448 | B2 | 8/2022 | Roh et al. |
| 2006/0053009 | A1 | 3/2006 | Jeong et al. |
| 2016/0351196 | A1 | 12/2016 | Fanty |
| 2019/0198012 | A1* | 6/2019 | Zhang ..................... G10L 15/22 |
| 2019/0318759 | A1 | 10/2019 | Doshi et al. |
| 2019/0348065 | A1 | 11/2019 | Talwar et al. |
| 2019/0378493 | A1 | 12/2019 | Kim et al. |
| 2020/0066262 | A1* | 2/2020 | Shu ....................... G10L 15/197 |
| 2020/0219513 | A1 | 7/2020 | Aguayo et al. |
| 2021/0074290 | A1* | 3/2021 | Choi ...................... G10L 15/22 |

FOREIGN PATENT DOCUMENTS

| | | | |
|---|---|---|---|
| KR | 20090054642 | A | 6/2009 |
| KR | 2018-0021444 | | 3/2018 |
| KR | 20180084394 | A | 7/2018 |
| KR | 102076212 | B1 | 2/2020 |
| KR | 20200018121 | A | 2/2020 |
| KR | 20200041199 | A | 4/2020 |
| KR | 20200063346 | A | 6/2020 |
| KR | 20200109827 | A | 9/2020 |
| KR | 20200109843 | A | 9/2020 |
| KR | 10-2020-0126670 | A | 11/2020 |

OTHER PUBLICATIONS

Written Opinion of the ISA for PCT/KR2022/001762 mailed May 13, 2022, 4 pages.

Extended European Search Report dated Apr. 29, 2024 issued in European Patent Application No. 22750050.1.

Korean Office Action dated Jan. 21, 2026 for KR Application No. 10-2021-0016321.

* cited by examiner

Case 1. Complete Sentence

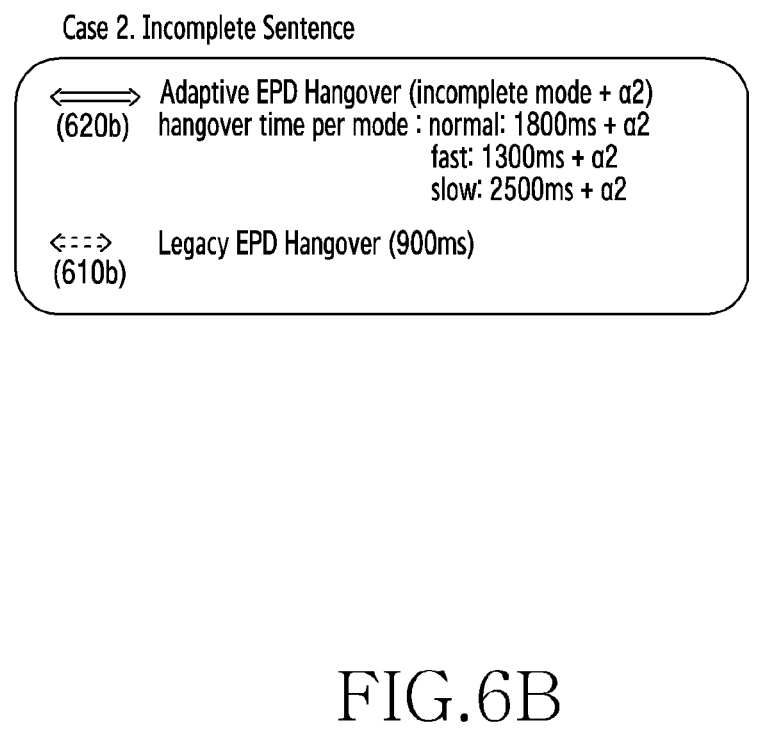

Case 2. Incomplete Sentence $\Longleftrightarrow$ Adaptive EPD Hangover (incomplete mode + α2)
(620b) hangover time per mode : normal: 1800ms + α2
fast: 1300ms + α2
slow: 2500ms + α2

$\Longleftrightarrow$ Legacy EPD Hangover (900ms)
(610b)

FIG.6B

Figure 6C:
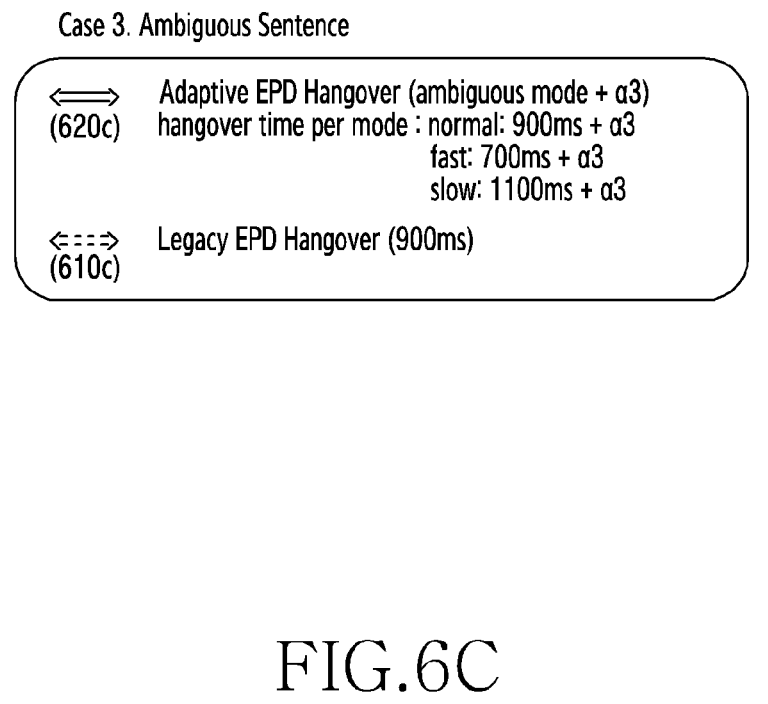

Case 3. Ambiguous Sentence

⟸⟹ Adaptive EPD Hangover (ambiguous mode + α3)
(620c)  hangover time per mode : normal: 900ms + α3
                                    fast: 700ms + α3
                                    slow: 1100ms + α3

⟸﹦⟹ Legacy EPD Hangover (900ms)
(610c)

FIG.6C (1610) Predictoion Layer (1620) Fully connect Layer (1630) Dropout Layer (1640) Backward Layer (1650) Forward Layer (1660) Embedding (1670) Inputs

ELECTRONIC DEVICE SUPPORTING SPEECH RECOGNITION AND OPERATING METHOD THEREOF

CROSS-REFERENCE TO RELATED APPLICATIONS

This application is a continuation of International Application No. PCT/KR2022/001762 designating the United States, filed on Feb. 4, 2022, in the Korean Intellectual Property Receiving Office and claiming priority to Korean Patent Application No. 10-2021-0016321, filed on Feb. 4, 2021, in the Korean Intellectual Property Office, the disclosures of which are incorporated by reference herein in their entireties.

BACKGROUND

Field

The disclosure relates to an apparatus supporting Automatic Speech Recognition (ASR) in an electronic device capable of performing natural language processing, and an operating method thereof.

Description of Related Art

Artificial intelligence technologies have advanced enough to provide a model which speaks in a human-like manner or shows a text. An example thereof may be a 'chatbot' or a 'chatterbot'. The chatbot or the chatterbot may be a computer program designed to perform a specified task, based on a conversation with a person through a speech by integrating a speech recognition technique.

The artificial intelligence technology may be based on a 'natural language processing' technique, for example, as a speech recognition technique for understanding a human speech. The natural language processing technique may be implemented on the premise of speech recognition. The natural language processing technique may include a technique which allows a machine computer to understand a human language. The 'natural language' may refer to a language created naturally while having been used by humans for a long time. As opposed thereto, there may be a 'machine language' or a 'programming language'. The 'machine language' or the 'programming language' may refer to a computer language. For example, the computer language used for coding has been developed to have many similarities to natural language. However, natural language processing may still be required to input an instruction so as to be understandable by a computer.

Typically, the natural language processing may be performed by natural language analysis, natural language understanding, and/or natural language generation operations. The natural language analysis may correspond to an operation of parsing the natural language according to grammar. The natural language understanding may correspond to an operation in which a computer performs a specified action according to an input given with the natural language. The natural language generation may correspond to an operation of converting content of tables or video into a human understandable natural language.

An electronic device may adopt a natural language analysis technique and support automatic speech recognition. A natural language may have several grammatical units, such as morphological, syntactic, and/or sentences. The natural language analysis technique is one of morphological analysis and syntactic analysis, and may be briefly classified into sematic analysis for interpreting a sentence based on meaning of the sentence and pragmatic analysis for determining which meaning is implied in the sentence in practice.

Accordingly, for natural language analysis, an electronic device supporting automatic speech recognition shall support obtaining of a speech duration and a pause duration from an audio signal input from a user's utterance and detecting of an end of the utterance end, based on the obtained result.

SUMMARY

Various embodiments of the disclosure may be provided to address the aforementioned problems and provide at least advantages described below.

Embodiments of the disclosure provide an electronic device which adaptively adjusts a hangover time for determining an end of an utterance, based on a partial text, and an operating method thereof.

Embodiments of the disclosure provide an electronic device which recognizes a user's context in response to a user's utterance to determine a voice activity end time point, and an operating method thereof.

According to an example embodiment of the disclosure, an electronic device may include: a microphone configured to convert and output a signal applied from the outside by an utterance into an electrical audio signal, a memory, and at least one processor electrically coupled to the microphone and the memory. The memory may store instructions which, when executed, cause the at least one processor to: identify an utterance type for an input audio signal based on one or more partial texts recognized sequentially from the audio signal input from the microphone, adaptively determine a hangover time based on the identified utterance type, and detect an end of the utterance for the audio signal by applying the hangover time. The utterance type for the input audio signal may correspond to one of a complete sentence, an incomplete sentence, and an ambiguous sentence. The complete sentence may be a text in which an instruction instructing execution of an operation is identifiable based on natural language understanding. The incomplete sentence may be a text in which the instruction instructing execution of the operation is not identifiable based on the natural language understanding. The ambiguous sentence may be a text not classified as the complete sentence or the incomplete sentence.

According to an example embodiment of the disclosure, a method of operating an electronic device may include: identifying an utterance type for an input audio signal based on one or more partial texts recognized sequentially from an audio signal which is an electrical signal converted from a signal applied from the outside by an utterance, adaptively determining a hangover time based on the identified utterance type, and detecting an end of the utterance for the audio signal by applying the hangover time. The utterance type for the input audio signal may correspond to one of a complete sentence, an incomplete sentence, and an ambiguous sentence. The complete sentence may be a text in which an instruction instructing execution of an operation is identifiable based on natural language understanding. The incomplete sentence may be a text in which the instruction instructing execution of the operation is not identifiable based on the natural language understanding. The ambiguous sentence may be a text not classified as the complete sentence or the incomplete sentence.

Furthermore, one or more selected features of any embodiment described in this disclosure may be combined with one or more selected features of any other embodiments described herein, provided that the alternative combination of features at least partially alleviates the one or more technical problem discussed in this disclosure or at least partially alleviates a technical problem discernable by one skilled in the art from this disclosure and further provided that the particular combination or permutation of embodiment features thus formed would not be understood by the skilled person to be incompatible.

Two or more physically distinct components in any described example implementation of this disclosure may alternatively be integrated into a single component where possible, provided that the same function is performed by the single component thus formed. Conversely, a single component of any embodiment described in this disclosure may alternatively be implemented as two or more distinct components to achieve the same function, where appropriate.

Various example embodiments of the disclosure may mitigate or obviate, at least partly, at least one of the problems and/or disadvantages associated with the prior art. Certain embodiments may provide at least one of the advantages described below.

BRIEF DESCRIPTION OF THE DRAWINGS

The above and other aspects, features and advantages of certain embodiments will be more apparent from the following detailed description, taken in conjunction with the accompanying drawings, in which:

FIG. 6B is a diagram illustrating an example of determining a hangover time for an utterance type, according to various embodiments;

FIG. 6C is a diagram illustrating an example of determining a hangover time for an utterance type, according to various embodiments;

DETAILED DESCRIPTION

Hereinafter, various example embodiments will be described in greater detail with reference to the accompanying drawings. In the following description, many specific details are provided to set forth an understanding of the disclosure. Accordingly, those of ordinary skill in the art will recognize that various changes and modifications of the various embodiments described herein may be made without departing from the scope and spirit of the disclosure. In addition, descriptions of well-known functions and constructions may be omitted for clarity and conciseness.

Figure 1:
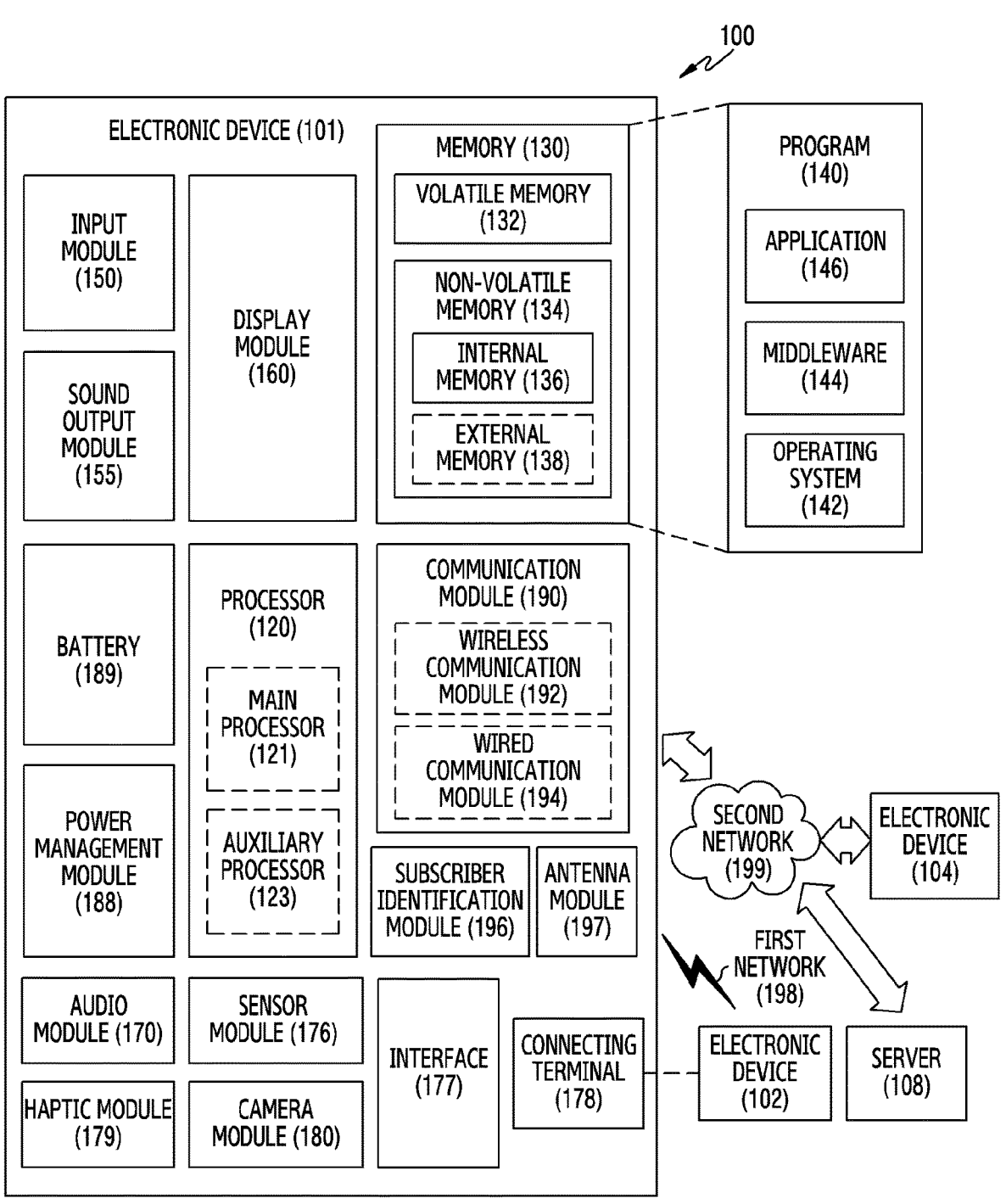
FIG. 1 is a block diagram illustrating an electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In general, when expressing thoughts or feelings in a verbal and written manner, a person may use a sentence as a minimum unit of representing complete content. The sentence may include one or more syntactic words in order to accurately convey the meaning. The syntactic words included in the sentence may be separated by word spacing or a pause. That is, in case of writing, the word spacing may be used to distinguish one syntactic word from another, and in case of speaking, the pause may be used to distinguish one syntactic word from another. The syntactic word may be a chunk of writing or speaking. One syntactic word may include one or more syllables. For example, a sentence 'tell me the weather' may include four syntactic words and five syllables.

According to an embodiment, one sentence based on a human utterance may include a plurality of syntactic words. The plurality of syntactic words of the sentence may be separated by a pause. For example, in one sentence 'tell me the weather', there may be a first pause duration which separates the syntactic word 'tell' and the syntactic word 'me, there may be a second pause duration which separates the syntactic word 'me' and the syntactic word 'the', and there may be a third pause duration which separates the syntactic word 'the' and the syntactic word 'weather'.

In various embodiments of the disclosure to be described in greater detail below, for convenience of explanation, a time duration from a start of a user's utterance to an end of the user's utterance may be referred to as a 'utterance region'. When the user's utterance occurs, a time duration until the end of the utterance is detected after the electronic device detects the start of the utterance may be referred to as an 'active region (or active duration)'. For example, the active region may have the same start time point as the utterance region, but may have a different end time point. The end time point of the active region may be a time point at which a specific time (hereinafter, referred to as a "hangover time" or a "residual time") elapses from the end time point of the utterance region in which the user's utterance ends. The hangover time or the residual time may be set by considering a pause which may exist between syntactic words. The hangover time or the residual time may prevent and/or reduce a time duration corresponding to the pause from being misunderstood as the end of the utterance.

According to an embodiment, the active region may be an entire time duration in which the electronic device detects a natural language depending on a human utterance for speech recognition. The active region may include a Voice Activity Duration (VAD) corresponding to a syntactic word in a sentence, a Voice Silent Duration (VSD) for separating one syntactic word from another, and/or a residual duration corresponding to a hangover time. The VAD may be a time duration in which an audible signal exists, and thus a person understands the meaning when listening to it. The VSD may be a time duration in which only an inaudible signal exists, and thus the person does not understand the meaning even when listening to it. The residual duration may be a time duration for detecting an end of an utterance, which shall be distinguished from a pause for separating one syntactic word from another.

In various embodiments of the disclosure to be described in greater detail below, various embodiments for adaptively adjusting a hangover time using one or more partial texts obtained sequentially from a natural language may be proposed so that an electronic device is able to detect an end of an utterance more precisely and rapidly. For example, a specific operation will be proposed in which the electronic device determines an utterance type according to one or more partial texts sequentially obtained from the natural language which is input on a real-time basis due to a user's utterance. The partial text may be, for example, a text recognized from a voice corresponding to each syntactic word of a sentence using speech recognition.

According to an embodiment, the electronic device may identify a type for the user's utterance (hereinafter, referred to as an 'utterance type') based on one or more partial texts provided sequentially, and may adaptively determine the hangover time depending on the identified utterance type. For example, the utterance type for a sentence based on one or more partial texts provided sequentially may be identified as one of a complete sentence and an incomplete sentence. The complete sentence may be a sentence corresponding to a set of one or more partial texts in which an instruction instructing execution of an operation is identifiable based on natural language understanding. The incomplete sentence may be a sentence corresponding to a set of one or more partial texts in which an instruction instructing execution of an operation is not identifiable based on natural language understanding. When the sentence based on the one or more texts provided sequentially is not identifiable as the complete sentence or the incomplete sentence, the electronic device may identify the utterance type of the sentence as an 'ambiguous sentence'. Hereinafter, in various embodiments of the disclosure, a sentence which is not classified or defined as the complete sentence or the incomplete sentence is referred to as the 'ambiguous sentence'.

According to an embodiment, the electronic device may identify the utterance type and user characteristic data, based on the one or more partial texts provided sequentially, and may adaptively determine a hangover time depending on the identified utterance type and user characteristic data.

In various embodiments, according to the utterance type, one or more partial texts obtained sequentially from a natural language may correspond to one of the complete sentence, the uncomplete sentence, and the ambiguous sentence If the one or more partial texts are texts in which the instruction instructing execution of the operation is identifiable based on natural language understanding, the electronic device may determine the utterance type for the one or more partial texts as the complete sentence. If the one or more partial texts are texts in which the instruction instructing execution of the operation is not identifiable based on natural language understanding, the electronic device may determine the utterance type for the one or more partial texts as the incomplete sentence. If the one or more partial texts are not clear to identify the instruction instructing execution of the operation based on natural language understanding, the electronic device may determine the utterance type of the one or more partial texts as the ambiguous sentence. The electronic device may learn the complete sentence or the incomplete sentence using, for example, a deep-learning technique, and may allow a memory to accumulate data based on the learning.

According to an embodiment, the electronic device may decrease a hangover time for the complete sentence, increase the hangover time for the incomplete sentence, and allow a hangover time for the ambiguous sentence to be maintained as a reference hangover time. The reference hangover time may be a hangover time which is set by default for speech recognition. In this case, the electronic device may perform an operation more rapidly and accurately in response to speech recognition.

In various embodiments, the user characteristic data may include a value indicating a degree for at least one of a speech rate, a pause time between utterances, a pause count, user's gender, age, region, and emotion. For example, when the user's speech rate is slow or the pause time is longer than an average, the electronic device may adjust the hangover time adaptively determined by considering an utterance characteristic. The electronic device may use, for example, a deep-learning technique to accumulate the user characteristic data in the memory.

According to an embodiment, the electronic device may identify an utterance type by analyzing one or more partial texts provided sequentially by speech analysis using a deep-learning model based, for example, on a Recurrent Neural Network (RNN). The RNN-based deep-learning model may support a scheme of performing a computation by persistently transferring any information (a hidden state) in a previous time step to a next time step. In deep-learning for identifying the utterance type, a computation for one or more partial texts which are subjected to the computation in advance may be skipped when a bidirectional Gated Recurrent Unit (GRU) computation is performed. For example, at a time of generating a partial text by a speech recognition function, for the GRU computation for a new partial text, the electronic device may use a value calculated for a preceding partial text. In this case, since it is possible to reduce a computational amount, the electronic device may obtain a result for speed recognition more rapidly.

According to an embodiment, the electronic device may use a GRU structure to determine whether a partial text obtained on a real-time basis from a natural language, e.g., an audio signal (or a voice signal) input through a user's utterance or a combination of one or more partial texts obtained previously and the partial text obtained on the real-time basis is a complete sentence or an uncomplete sentence.

According to various embodiments, the electronic device may adaptively adjust the hangover time to be applied so that an end of the utterance is detected for each situation when performing speech recognition, thereby providing a service such as a voice assistant suitable for the situation when performing the speech recognition.

Figure 2:
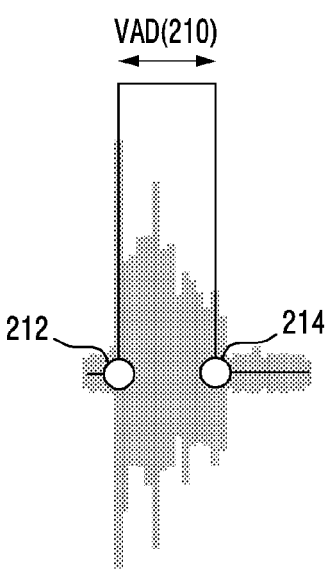
FIG. 2 is a diagram illustrating an example of one Voice Activity Duration (VAD) which may be used as a basic unit for speech recognition in an electronic device, according to various embodiments.

FIG. 2 is a diagram illustrating an example VAD 210 which may be used as a basic unit for speech recognition in an electronic device (e.g., the electronic device 101 of FIG. 1), according to various embodiments.

Referring to FIG. 2, the VAD 210 in which the electronic device extracts a voice signal may be defined by a time point 212 at which a syntactic word starts and a time point 214 at which the syntactic word ends.

According to an embodiment, the time point 212 at which the syntactic word starts may be a time point at which a first syntactic word included in a sentence starts or a time point at which a second syntactic word and/or subsequent syntactic words starts. The time point at which the first syntactic word included in the sentence starts may be a Voice Detection Start Point (VDSP) or a voice activity start time point. The time point at which the second syntactic word and subsequent syntactic words included in the sentence start may be a Voice Continuation time Point (VCP) 212.

According to an embodiment, the time point 214 at which the syntactic word ends may be a time point at which one or more syntactic words included in the sentence end. A time point at which each of syntactic words included in the sentence ends may be a Voice Break time Point (VBP) 214.

It is assumed that the VAD 210 corresponds to one syntactic word in the above description based on FIG. 2. However, the VAD 210 may also be a time duration in which an audible signal corresponding to one syllable exists.

According to an embodiment, the electronic device may use a speech recognition technique to convert a voice signal (or an audible signal, audio signal) which is a natural language caused by a human utterance to a machine language recognizable by a machine. The machine language may have, for example, a text form. The electronic device may obtain a voice signal caused by a human utterance in the VAD 210, and may analyze the obtained voice signal to acquire an utterance sentence having a text form.

According to an embodiment, the VAD 210 in which the electronic device extracts the voice signal may be defined as a time duration from the VCP 212 or the VDSP corresponding to a voice activity start time point to the VBP 214. A signal of an audible frequency band which is audible to humans may exist in the VAD 210. The VAD 210 may be, for example, a duration in which a continuous audio signal corresponding to one syntactic word exists without interruption. The single syntactic word may include one or more syllables. In the following description, a text generated in one VAD 210 will be used as an example of a partial text. The partial text may be, for example, a text obtained by analyzing an audio signal corresponding to one syntactic word. However, according to various embodiments proposed in the disclosure, the partial text may also be defined as a text generated from an audio signal extracted from a time duration defined differently or a plurality of VADs in addition to the single VAD 210.

Figure 3:
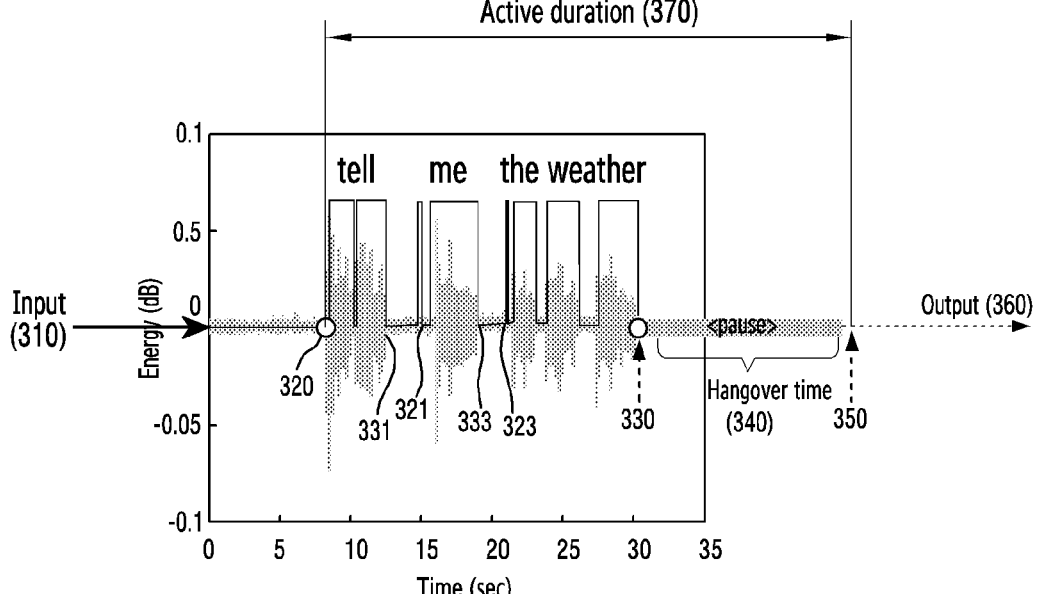
FIG. 3 is a diagram illustrating an example of detecting a voice activity end time point in an electronic device, according to various embodiments.

FIG. 3 is a diagram illustrating an example of detecting a voice activity end time point in an electronic device (e.g., the electronic device 101 of FIG. 1), according to various embodiments.

Referring to FIG. 3, an input signal 'Input' 310 may be a signal which is input caused by a human utterance. The input signal 310 may be, for example, an audio signal converted from an audible signal caused by the human utterance to an electrical signal through a microphone. An output signal 'Output' 360 may be information obtained from the input signal 310, based on a natural language analysis technique. The output signal 360 may include, for example, information on a voice activity start time point 320 and/or a voice activity end time point 350. The voice activity start time point 320 may be a time point at which an audio signal for speech recognition starts to be input due to the start of the human utterance. The voice activity end time point 350 may be a time point of detecting that the input of the audio signal for speech recognition does not exist for a specific time (e.g., a hangover time 340) after the human utterance stops.

According to an embodiment, an active duration 370 may be defined as a time duration from the voice activity start time point 320 to the voice activity end time point 350. The active duration 370 may be a time duration which may be regarded as a state where an utterance is being made by humans. The electronic device 101 may provide a detection function for distinguishing a speech duration in which a voice signal exists and a pause duration in which the voice signal does not exist in the active duration 370. The detection function may be, for example, a Voice Activity Detection (VAD) function which detects whether a voice is active. The VAD function may detect the voice activity start time point 320, a plurality of VBPs 331, 333, and 330, a plurality of VCPs 321 and 323, or the voice activity end time point 350 from the audio signal 310 which is input caused by the human utterance. The voice activity end time point 350 may be detected when a hangover time 340 elapses after the VBP 330 is detected.

According to an embodiment, confirming of an end (end point) of an utterance may be one of important factors in a speech recognition service which may be provided by the electronic device 101. Therefore, the speech recognition service may use an End Point Detection (EPD) scheme which is one of voice-based techniques. According to the EPD scheme, the electronic device 101 may use a Voice Activity Detection (VAD) technique which is a voice detection function to monitor a presence of voice (voice active region) or an absence of voice (noise only or silence region), and may determine that an utterance ends only when there is no voice for a specific time. Upon detecting the voice activity end time point 350 at which the utterance ends, the electronic device 101 may process a result of a final utterance, based on a full text recognized until the end of the utterance after the utterance starts in Automatic Speech Recognition (ASR).

According to an embodiment, the electronic device 101 may consider an utterance type to determine the hangover time 340 which may be considered to detect the voice activity end time point 350. The utterance type may be identified by one or more partial texts obtained on a real-time basis through speech recognition and output sequentially. A voice signal may be extracted from an audio signal which is input from the voice activity start time point 320 or the VCPs 321 and 323 to the VBPs 331, 333, and 330, and the extracted audio signal may be subjected to speech recognition to obtain a text on a real-time basis.

According to an embodiment, when a person utters one complete sentence 'tell me the weather' including 4 syntactic words and 7 syllables, the electronic device 101 may convert an audible signal corresponding to the complete sentence input by the person into an audio signal which is an electrical signal having a specific amplitude and period as illustrated. The audio signal may include one voice activity start time point 320, the plurality of VBPs 331, 333, and 330, the plurality of VCPs 321 and 323, and/or the voice activity end time point 350. The plurality of VBPs 331, 333, and 330 may be time points at which three syntactic words end, and the plurality of VCPs 321 and 323 may be time points at which new syntactic words start after the VBPs 331, 333, and 330 are detected. In this case, since a pause duration between the syntactic word 'tell' and the syntactic word 'me', a pause duration between syntactic word 'me' and the syntactic word 'the' or a pause duration between the syntactic word 'the' and the syntactic word 'weather' is shorter than the hangover time 340 which is not sufficient to be determined as an end of the utterance, the electronic device 101 may not determine this as the end of utterance. The electronic device 101 may detect that the utterance ends when a pause duration exceeds the hangover time 340 after the syntactic word 'weather'.

Figure 4:
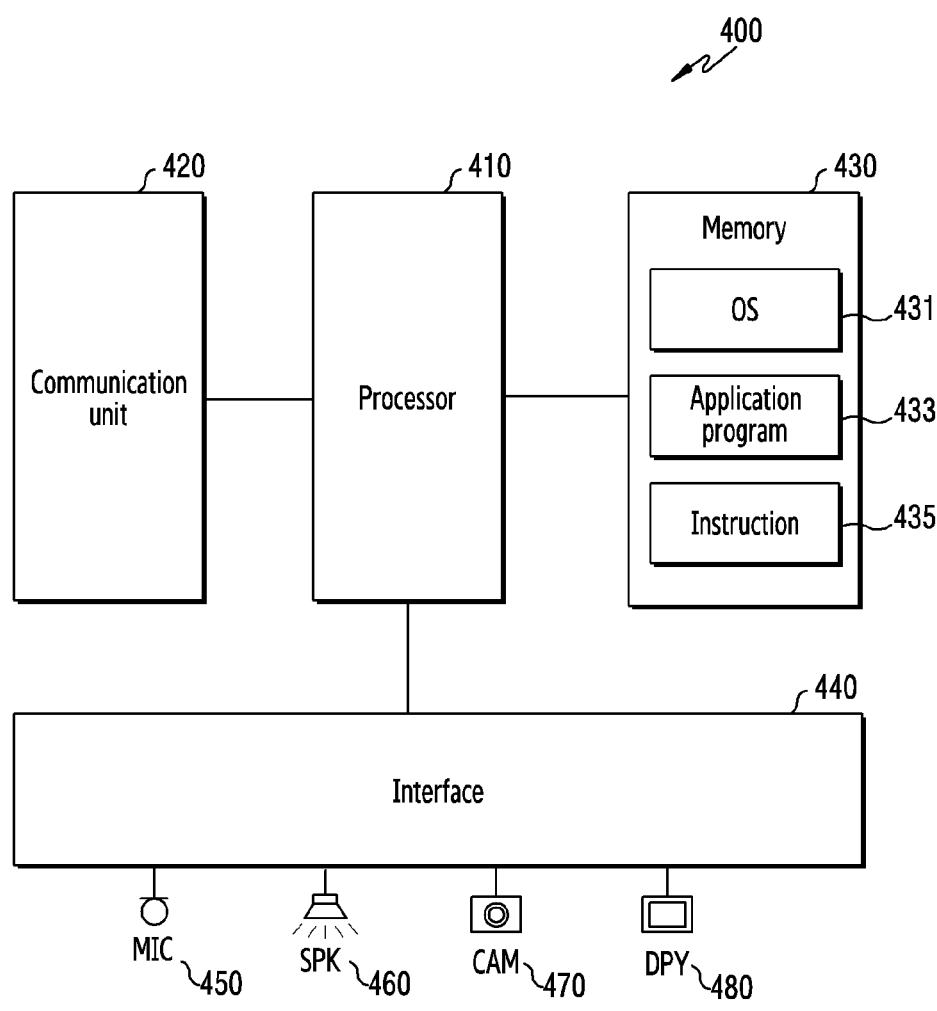
FIG. 4 is a block diagram illustrating an example configuration of an electronic device supporting speech recognition, according to various embodiments.

FIG. 4 is a block diagram 400 illustrating an example configuration of an electronic device supporting speech recognition (e.g., the electronic device 101 of FIG. 1), according to various embodiments.

Referring to FIG. 4, the electronic device may include a processor (e.g., including processing circuitry) 410, a communication unit (e.g., including communication circuitry) 420, a memory 430, and/or an interface (e.g., including interface circuitry) 440. At least one of a Microphone (MIC) 450, a Speaker (SPK) 460, a Camera (CAM) 470, and a Display (DPY) 480 may be coupled to the interface 440. The memory 430 may include an Operating System (OS) 431, an application program 433, and instructions 435. The electronic device may include an additional component other than the components of FIG. 4, or at least one of the components of FIG. 4 may be omitted.

According to an embodiment, the communication unit 420 may include various communication circuitry and provide an interface for communication with other systems or devices. The communication unit 420 may include a network interface card or wireless transmission/reception unit which enables communication through an external network (e.g., a network). The communication unit 420 may perform signal processing for accessing a wireless network. The wireless network may include, for example, at least one of a wireless Local Area Network (LAN) or a cellular network (e.g., Long Term Evolution (LTE)).

According to an embodiment, the interface 440 may include various interface circuitry and detect an input from the outside (e.g., a user), and may provide data corresponding to the detected input to the processor 410. The interface 440 may include at least one hardware module for detecting the input from the outside. The at least one hardware module may include, for example, at least one of a sensor, a keyboard, a key pad, a touch pad, and a touch panel. When the interface 440 is implemented as the touch panel, the interface 440 may be combined with the display 480 to provide a touch screen. In this case, the interface 440 may provide data for a user's touch input (e.g., tap, press, pinch, stretch, slide, swipe, rotate, etc.) to the processor 410.

According to an embodiment, the display 480 may perform functions for outputting information in the form of numbers, characters, images, and/or graphics. The display 480 may include at least one hardware module for the output. The at least one hardware module may include, for example, at least one of a Liquid Crystal Display (LCD), a Light Emitting Diode (LED), a Light emitting Polymer Display (LPD), an Organic Light Emitting Diode (OLED), an Active Matrix Organic Light Emitting Diode (AMO-LED), and a Flexible LED (FLED). The display 480 may display a screen corresponding to data received from the processor 410. The display 480 may be referred to as an 'output unit', a 'display unit', or other terms having an equivalent technical meaning.

According to an embodiment, the microphone 450 which may be electrically coupled to the processor 410 through the interface 440 may convert an audible signal input from the outside due to a user's utterance into an electrical audio signal. The audio signal converted by the microphone 450 may be provided to the processor 410 through the interface 440. In addition to the microphone 450, a component which may be electrically coupled to the processor 410 through the interface 440 may be at least one of the speaker 460 and the camera 470. The speaker 460 may output the electrical audio signal provided from the processor 410 through the interface 440 by converting the signal into an audible signal which is audible to humans. The camera 470 may capture a subject in response to the control from the processor 410, convert the image according to the capture into an electrical signal, and provide it to the processor 410 through the interface 440.

According to an embodiment, the memory 430 may store an operating system 431 corresponding to a basic program for operating the electronic device, an application program 433 supporting various functions, instructions 435 allowing the processor 410 to perform an operation according to various embodiments, or data such as setup information. The memory 430 may be constructed of a volatile memory, a non-volatile memory, or a combination of the volatile memory and the non-volatile memory. The memory 430 may provide the stored data at the request of the processor 410.

According to an embodiment, the processor 410 may include various processing circuitry and use instructions 435 stored in the memory 430 to control at least one of other components of the electronic device and/or execute data processing or computation for communication. The processor 410 may include at least one of a Central Processing Unit (CPU), a dedicated processor, a Graphic Processing Unit (GPU), a Micro Controller Unit (MCU), a sensor hub, a supplementary processor, a communication processor, an application processor, an Application Specific Integrated Circuit (ASIC), a Field Programmable Gate Arrays (FPGA), and may have a plurality of cores.

According to an embodiment, the processor 410 may process data obtained through the interface 440 or may control an operational state of various input and/or output means through the interface 440. The various input and/or output means may include, for example, at least one of a Microphone (MIC) 450, a Speaker (SPK) 460, a Camera (CAM) 470, or a Display (DPY) 480. The processor 410 may transmit and/or receive a signal through the communication unit 420.

According to an embodiment, when a user's utterance is made, the processor 410 may analyze a voice signal provided from the microphone 450 to identify an utterance type using a voice-based model, and may adaptively adjust a hangover time for determining an end of the utterance, based on the identified utterance type. The processor 410 may generate a final text through automatic speech recognition at a time of recognizing the end of the utterance by applying the hangover time, and may provide overall control to perform an operation desired by a user using the final text.

For example, the processor 410 may identify an utterance type for an input audio signal, based on one or more partial texts recognized sequentially from an audio signal which is an electrical signal converted from a signal applied from the outside due to the user's utterance. The processor 410 may adaptively determine a hangover time, based on the identified utterance type, and may detect an end of the utterance for the audio signal by applying the hangover time. Herein, the utterance type for the input audio signal may correspond to one of a complete sentence, an incomplete sentence, and an ambiguous sentence. The complete sentence may be a text in which an instruction instructing execution of an operation is identifiable based on natural language understanding. The incomplete sentence may be a text in which the instruction instructing execution of the operation is not identifiable based on the natural language understanding. The ambiguous sentence may be a text not classified as the complete sentence or the incomplete sentence.

In various embodiments, if the meaning to be conveyed by a sentence of one partial text detected through automatic speech recognition or at least two partial texts detected sequentially is clear, the sentence may be identified as the complete sentence.

In various embodiments, if the meaning to be conveyed by a sentence of one partial text detected through automatic speech recognition or at least two partial texts detected sequentially is not clear in part, the sentence may be identified as the incomplete sentence.

In various embodiments, if a sentence of one partial text detected through automatic speech recognition or at least two partial texts detected sequentially is not classified as the complete sentence or the incomplete sentence, the sentence may be classified as the ambiguous sentence.

Table 1 below summarizes examples in which a sentence type is identifiable for each utterance type in the electronic device 101, based on the criteria proposed above.

TABLE 1

| sentence type | detailed content | sentence example |
|---|---|---|
| complete sentence | Voice secretary type sentences capable of identifying and executing right intention (assuming that, at corresponding utterance, a voice secretary instruction is driven actually) | Show me latest photos taken Create a reminder to buy milk ☓ Create a reminder— incomplete sentence (intention unclear) Call mom Set alarm for 6:00 am Open Pandora Set a timer for 10 minutes What time is it now Change my name What's the value of pi Turn on Bluetooth Turn on flashlight Turn off do not disturb Turn off flashlight Lock phone Turn off phone Read today's schedule Read next message Turn off all alarms What is my nickname Close all apps Show what was shot in New York yesterday When is Thanksgiving next year Delete reminders Delete my alarms |
| | Sentences besides a voice secretary type having a grammatically complete meaning ☓~having a complete meaning: meaning an English grammatically complete sentence (example: subject + verb + object) | Who is the President of United States Last Sunday I went to my friend's house Riding on a roller coaster is very exciting The picture on the shirt is very cute |

TABLE 1-continued

| sentence type | detailed content | sentence example |
|---|---|---|
| | Sentences capable of corresponding with voice secretary Chatbot, Question Answering (Q&A) systems ✗ Chatbot—a system for understanding content a user has said and sending this as a query and answering ✗ Q&A system—a system for automatically responding to a query a user has raised | Do you know who I am How can I get to T-Express from Everland I want to eat noodle at Everland |
| incomplete sentence | Voice secretary type sentences not capable of determining an object intention (it finally says a complete sentence, but it is classified as an incomplete sentence in course of taking a rest intentionally during utterance) | Show me latest ✗ Show me latest photos taken—complete sentence (intention clear) Set alarm for Set a timer for What time is Change my What's the value of Turn on Turn off do not Turn off Read today's Read next What is my Close all Show what was shot in When is Thanksgiving next Delete my |
| | Sentences besides a grammatically incomplete voice secretary type | Who is the Last Sunday I went to my friend's Riding on a The picture on the shirt is |
| | Sentences not capable of answering with voice secretary Chatbot, Q&A systems | Do you know How can I get to I want to eat |
| ambiguous sentence | When it is not complete and incomplete sentences, it is regarded as an ambiguous sentence. When it is one word utterance, it is basically an ambiguous sentence. When it is a grammatically abnormal sentence at partial ASR processing | Show, Call, Open, Men, Women (one-word sentences) Show Christmas photos which were taking at(mistyping) |

In the examples of Table 1 above, a sentence type is determined based on English. A criterion of determining the sentence type may be different for each language. Therefore, the criterion for determining the sentence type shall be prepared for each language supported by the electronic device.

For example, in case of Korean, when a sentence structure is complete, it may be treated as a complete sentence, but some noun-type non-final ending sentences may also be treated as the complete sentence. When the sentence structure is incomplete, it may be treated as an incomplete sentence, and when a user's context is incomplete in part, it may be treated as the incomplete sentence even if it is a grammatically complete sentence. In case of Korean, whether a sentence is complete/incomplete may be classified based on a postposition, and the sentence may be classified based on a specified postposition.

The sentence type may be classified into, for example, the complete sentence, the incomplete sentence, and the ambiguous sentence. In case of one or two words, since an utterance is short, it may be classified into a sentence which is not determined to be complete/incomplete. Since such a sentence is not classified into the complete sentence or the incomplete sentence, it may be identified as the ambiguous sentence. However, without being limited thereto, it may be treated to be complete/incomplete in an exceptional case.

Additionally, in case of a voice assistant, there is a tendency to prefer a short and concise utterance expression, and since an operation is normally performed when an utterance is actually made with a corresponding type, the electronic device 101 may identify a noun expression of a voice assistant type as the complete sentence even if it is not a grammatically complete sentence. A basic classification method is as shown in Table 1 above, but an exceptional treatment is also possible even if it is shown in each table.

Table 2 below summarizes examples of exceptional utterances with respect to a sentence type for each utterance in the electronic device 101.

TABLE 2

| sentence type | exception utterances |
|---|---|
| complete sentence | YouTube, Melon, Calculator, Weather, Naver, KakaoTalk, Song, News, Next, Calendar, Music, Bucks, Briefing, Bluetooth, Settings, Screenshot, Humidity, Time, Clock, Wifi, Internet, Reboot, Capture, Timer, Pace Book, Google, Tmap |
| incomplete sentence | Tomorrow, Bixby, yesterday, now, present, world |

As summarized in Table 2 above, since it is not possible to process an utterance practically usable when it is used as a single word, an exceptional word may be treated as a complete/incomplete sentence. By focusing on usability, in case of an app name and a chatbot-based utterance, even a single word may be treated as a complete sentence. Dates and special purpose words, which have usability, may also be treated as an incomplete sentence.

According to an embodiment, a criterion of determining a sentence type may be defined differently by considering a characteristic of each language. That is, since the criterion of determining the sentence type may be different for each language, the criterion of determining the sentence type may be defined for an exceptionally treated part or each language supported in the electronic device.

Figure 5:
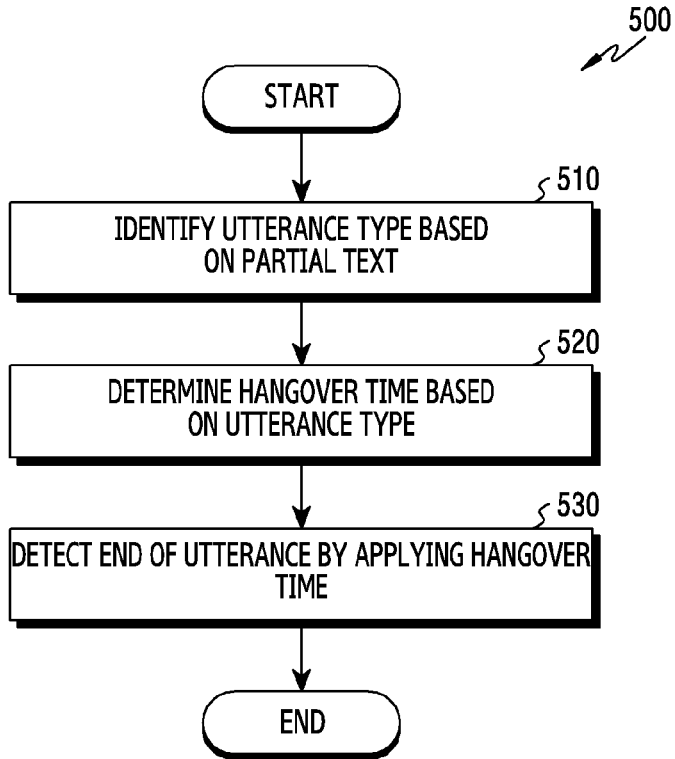
FIG. 5 is a flowchart illustrating an example operation based on speech recognition in an electronic device, according to various embodiments.

FIG. 5 is a flowchart 500 illustrating an example method of performing an operation based on speech recognition in an electronic device (e.g., the electronic device 101 of FIG. 1), according to various embodiments.

Referring to FIG. 5, in operation 510 according to an embodiment, the electronic device 101 may identify an utterance type based on a partial text. To this end, the electronic device 101 may receive an audible signal caused by a user's utterance from the outside, and may convert the received audible signal into an electrical audio signal. The electronic device 101 may perform pre-processing on the audio signal, and may obtain a partial text on a real-time basis from the pre-processed audio signal, e.g., a voice signal. The electronic device 101 may identify an utterance type for the audio signal, based on one or more partial texts obtained sequentially. The one or more partial texts considered to identify the utterance type may be a partial text newly obtained on a real-time basis or a combination of one or more partial texts previously obtained and the partial text newly obtained.

In operation 520 according to an embodiment, the electronic device 101 may adaptively determine a hangover time, based on the identified utterance type using the partial text, and may detect a voice activity end time point of the audio signal by applying the determined hangover time. Assuming that the utterance type is one of a complete sentence, an incomplete sentence, and an ambiguous sentence, the electronic device 101 may determine a hangover time (e.g., 600 ms) shorter than a reference hangover time (e.g., 900 ms) with respect to the complete sentence, may determine a hangover time (e.g., 1800 ms) longer than the reference hangover time (e.g., 900 ms) with respect to the incomplete sentence, and may determine to maintain the reference hangover time 900 ms with respect to the ambiguous sentence.

In operation 530 according to an embodiment, the electronic device 101 may detect an end of utterance by applying the hangover time. For example, the electronic device 101 may monitor whether there is occurrence of a pause duration greater than or equal to the hangover time (e.g., one of 600 ms, 900 ms, and 1800 ms) determined based on the utterance type from the audio signal. Upon the occurrence of the pause duration greater than or equal to the hangover time, the electronic device 101 may detect that a user's utterance ends at that time point. Upon detecting the end of the utterance, the electronic device 101 may stop an operation for speech recognition, may perform an operation requested by the user through natural language analysis, based on a text analyzed until that time point, and may provide a result thereof to the user.

According to an embodiment, if the utterance type is not identified based on a partial text caused by speech recognition performed on a real-time basis, the electronic device 101 may identify the utterance type by additionally considering a partial text to be newly provided through speech recognition. As an example thereof, an RNN-based deep-learning model may be used. A GRU computation may be applied to the RNN-based deep-learning model. When using the RNN-based deep-learning model to which a GRU computation is applied, the electronic device 101 may not perform the computation even if a partial text previously analyzed is provided again through speech recognition but may use a result of a computation previously performed. In this case, the electronic device 101 may reduce a computation performed on the partial text to identify the utterance type, thereby improving a processing speed.

According to an embodiment, when determining the hangover time in operation 520, the electronic device 101 may further consider personal data such as an individual speed rate, pause time, pause count, user age, region, or emotion together with the utterance type.

Figure 6A:
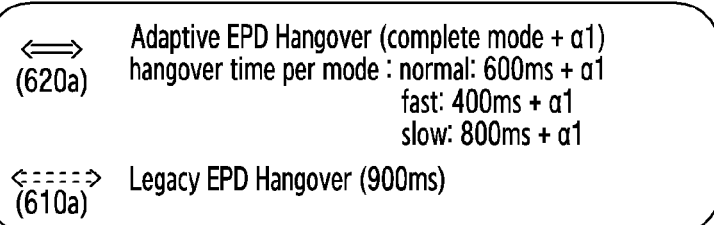
FIG. 6A is a diagram illustrating an example of determining a hangover time for an utterance type, according to various embodiments.

FIGS. 6A, 6B and 6C are diagrams illustrating examples of determining a hangover time for each utterance type, according to various embodiments.

Referring to FIG. 6A, when the utterance type is a complete sentence, a hangover time (e.g., adaptive EPD hangover) 620a may be determined as a relatively short time (e.g., less than 900 ms) compared to a legacy hangover time (e.g., legacy EPD hangover time) (e.g., 900 ms) 610a corresponding to a reference hangover time. For example, the hangover time 620a determined for the utterance type of the complete sentence may be 600 ms.

According to an embodiment, the hangover time 620a may be adaptively adjusted by further considering user characteristic information such as a speech rate or a pause time together with a complete sentence corresponding to the utterance type. For example, if the utterance type is the complete sentence and the speech rate is normal, the hangover time 620a may be determined to be '600 ms+$\alpha$1'. 600 ms may be a hangover time which may be given for the utterance type of the complete sentence and normal state. As another example, if the utterance type is the complete sentence and the speech rate is fast, the hangover time 620a may be determined to be '400 ms+$\alpha$1'. 400 ms may be a hangover time which may be given for the utterance type of the complete sentence and fast state. As another example, if the utterance type is the complete sentence and the speech rate is slow, the hangover time 620a may be determined to be '800 ms+$\alpha$1'. 800 ms may be a hangover time which may be given for the utterance type of the complete sentence and slow state. In the examples above, a may be a weight which may be given for a combination of user characteristic information such as a speech rate, pause time, or pause count for each speaker. In this case, $\alpha$1 may be a weight which may be given for a case where the utterance type is the complete sentence.

When the hangover time is determined according to FIG. 6A described above, EPD occurs at least ⅓ times faster than a case of applying a legacy hangover time which is a reference hangover time, thereby performing an operation more rapidly after generating a final text.

Referring to FIG. 6B, when the utterance type is an incomplete sentence, a hangover time 620b may be determined as a relatively long time (e.g., greater than 900 ms) compared to a legacy hangover time (e.g., 900 ms) 610b corresponding to a reference hangover time. For example, the hangover time 620b determined for the utterance type of the incomplete sentence may be 1800 ms.

According to an embodiment, the hangover time 620b may be adaptively adjusted by further considering user characteristic information such as a speech rate or a pause time together with an incomplete sentence corresponding to the utterance type. For example, if the utterance type is the incomplete sentence and the speech rate is normal, the hangover time 620*b* may be determined to be '1800 ms+α2'. 1800 ms may be a hangover time which may be given for the utterance type of the incomplete sentence and normal state. As another example, if the utterance type is the incomplete sentence and the speech rate is fast, the hangover time 620*b* may be determined to be '1300 ms+α2'. 1300 ms may be a hangover time which may be given for the utterance type of the incomplete sentence and fast state. As another example, if the utterance type is the incomplete sentence and the speech rate is slow, the hangover time 620*b* may be determined to be '2500 ms+α2'. 2500 ms may be a hangover time which may be given for the utterance type of the incomplete sentence and slow state. In the examples above, a may be a weight which may be given for a combination of user characteristic information such as a speech rate, pause time, or pause count for each speaker. In this case, α2 may be a weight which may be given for a case where the utterance type is the incomplete sentence.

When the hangover time is determined according to FIG. 6B described above, the incomplete sentence is processed by waiting for a pause which is two times longer than a case of applying a legacy hangover time which is a reference hangover time, thereby sufficiently conveying words intended by a user. This may facilitate to perform a normal NLU operation after generating a text by applying the user's context more precisely.

Referring to FIG. 6C, when the utterance type is an ambiguous sentence, a hangover time 620*c* may be determined to be the same time as a legacy hangover time (e.g., 900 ms) 610*c* corresponding to a reference hangover time. For example, the hangover time 620*c* determined for the utterance type of the ambiguous sentence may be 900 ms. By this decision, the legacy hangover time which is the reference hangover time is maintained when a user's context is ambiguous, so that a typical characteristic may be applied.

According to an embodiment, the hangover time 620*c* may be adaptively adjusted by further considering user characteristic information such as a speech rate or a pause time together with an ambiguous sentence corresponding to the utterance type. For example, if the utterance type is the ambiguous sentence and the speech rate is normal, the hangover time 620*c* may be determined to be '900 ms+α3'. 900 ms may be a hangover time which may be given for the utterance type of the ambiguous sentence and normal state. As another example, if the utterance type is the ambiguous sentence and the speech rate is fast, the hangover time 620*c* may be determined to be '700 ms+α3'. 700 ms may be a hangover time which may be given for the utterance type of the ambiguous sentence and fast state. As another example, if the utterance type is the ambiguous sentence and the speech rate is slow, the hangover time 620*c* may be determined to be '1100 ms+α3'. 1100 ms may be a hangover time which may be given for the utterance type of the ambiguous sentence and slow state. In the examples above, a may be a weight which may be given for a combination of user characteristic information such as a speech rate, pause time, or pause count for each speaker. In this case, α3 may be a weight which may be given for a case where the utterance type is the ambiguous sentence.

Since various research results show that a speech rate or how frequently a pause is used is highly dependent on age, an age part is more weighted internally. It may be determined such that a basic mode is set to be fast, normal, and slow, and an EPD setting time is different for each setting.

In addition to age and gender, a partial text or full text transferred on ASR to measure an individual speed rate and/or a pause time and count between utterances (used to calculate an individual deviation as to how long to wait in an incomplete sentence) may be used to set alpha values α1, α2, and α3 with respect to an utterance type for each individual, so that a final personalized EPD time is applied according to a context of the utterance.

Figure 7A:
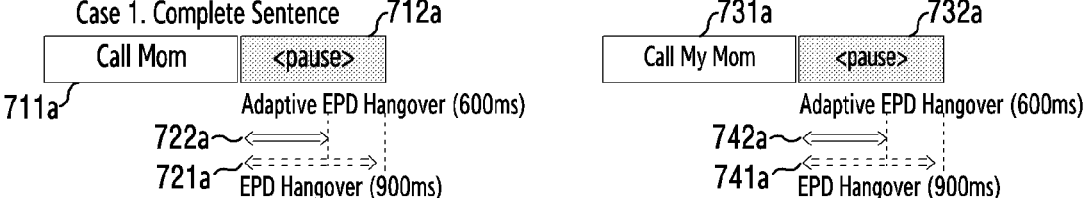
FIG. 7A is a diagram illustrating an example of determining a hangover time for an utterance type in an electronic device, according to various embodiments.
Figure 7B:
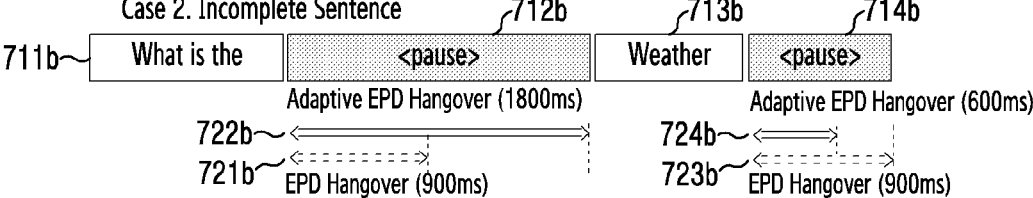
FIG. 7B is a diagram illustrating an example of determining a hangover time for an utterance type in an electronic device, according to various embodiments.
Figure 7B:
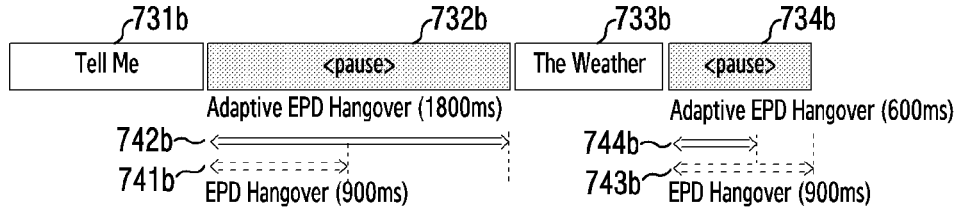
Figure 7C:
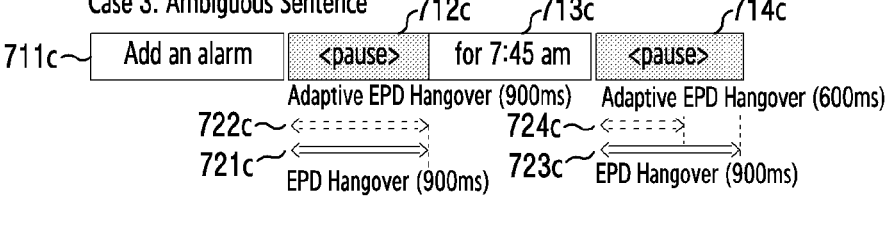
FIG. 7C is a diagram illustrating an example of determining a hangover time for an utterance type in an electronic device, according to various embodiments.
Figure 7C:
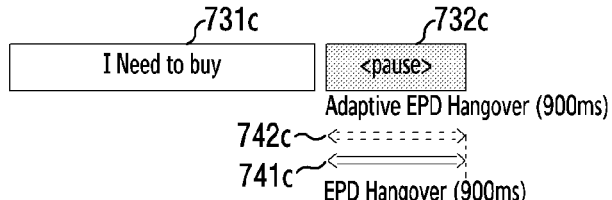

FIGS. 7A, 7B and 7C are diagrams illustrating examples of determining a hangover time for each utterance type in an electronic device (e.g., the electronic device 101 of FIG. 1), according to various embodiments.

Referring to FIG. 7A, the electronic device 101 may identify that an utterance type for one or more partial texts "call Mom" 711*a* or "call my mom" 731*a* recognized by an automatic speech recognition function is a complete sentence. In this case, the electronic device 101 may determine an applied hangover time 722*a* or 742*a* to be 600 ms shorter than 900 ms which is a reference hangover time 721*a* or 741*a*. Upon detecting a pause duration 712*a* or 732*a* exceeding 600 ms which is the applied hangover time 722*a* or 742*a* after detecting a VBP of the "call Mon" 711*a* or "call my mom" 731*a*, the electronic device 101 may confirm that the utterance ends. Upon confirming the end of the utterance, the electronic device 101 may perform natural language analysis for a full text including one or more partial texts identified as the complete sentence, and based on a result thereof, may provide an operation of making a call to mom according to a user's context.

Referring to FIG. 7B, the electronic device 101 may identify that an utterance type of a first partial text "What is the" 711*b* or "tell me" 731*b* recognized by an automatic speech recognition function as an incomplete sentence. In this case, the electronic device 101 may determine an applied hangover time 722*b* or 742*b* to be 1800 ms shorter than 900 ms which is a reference hangover time 721*b* or 741*b*. After detecting a VBP of the "What is the" 711*b* or "tell me" 731*b*, an utterance is continued before a pause duration 721*b* or 732*b* exceeds an applied hangover time, and thus the electronic device 101 may recognize a second partial text "weather" 713*b* or "the weather" 733*b*. The electronic device 101 may perform a computation on the newly recognized second partial text other than the first partial text previously subjected to the computation, and thus may identify that an utterance type for "What is the weather" or "tell me the weather" which is a combination of two partial texts is a complete sentence. In this case, the electronic device 101 may determine the applied hangover time 724*b* or 744*b* to be 600 ms shorter than 900 ms which is a reference hangover time 723*b* or 743*b*. Upon detecting a pause duration 714*a* or 734*a* exceeding 600 ms which is the applied hangover time 724*a* or 744*a* after detecting a VBP of the "What is the weather" or "tell me the weather", the electronic device 101 may confirm that the utterance ends. Upon confirming the end of the utterance, the electronic device 101 may perform natural language analysis for a full text including one or more partial texts identified as the complete sentence, and based on a result thereof, may provide an operation of guiding today's weather through a voice or screen according to a user's context.

Referring to FIG. 7C, the electronic device 101 may identify that an utterance type for a first partial text "Add an alarm" 711*c* or "I need to buy" 731*c* recognized by an automatic speech recognition function is an ambiguous sentence. In this case, the electronic device 101 may determine an applied hangover time 722*c* or 742*c* to be 900 ms which is a reference hangover time 722*a* or 742*a*. After detecting a VBP of the "Add an alarm" 711b or "I need to buy" 731c, the electronic device 101 may monitor whether the utterance is continued before a pause duration 712c or 732c exceeds 900 ms which is the applied hangover time 722c or 742c. After recognizing the first partial text "Add an alarm" 711c, the electronic device 101 may recognize a second partial text "for 7:45 am" 713c before 900 ms which is the applied hangover time 722c elapses. The electronic device 101 may perform a computation on the newly recognized second partial text other than the first partial text previously subjected to the computation, and thus may identify that an utterance type for "Add an alarm for 7:45 am" which is a combination of two partial texts is a complete sentence. In this case, the electronic device 101 may determine the applied hangover time 724c to be 600 ms shorter than 900 ms which is a reference hangover time 723c. Upon detecting a pause duration 714c exceeding 600 ms which is the applied hangover time 724c after detecting a VBP of the "Add an alarm for 7:45 am", the electronic device 101 may confirm that the utterance ends. Upon confirming the end of the utterance, the electronic device 101 may perform natural language analysis for a full text including one or more partial texts identified as the complete sentence, and based on a result thereof, may provide an operation of guiding that a schedule is added through a voice or screen according to a user's context. However, if the second partial text is not recognized until 900 ms which is the applied hangover time 742c elapses after recognizing the first partial text "I need to buy" 731c, the electronic device 101 may end the speech recognition function.

Figure 8:
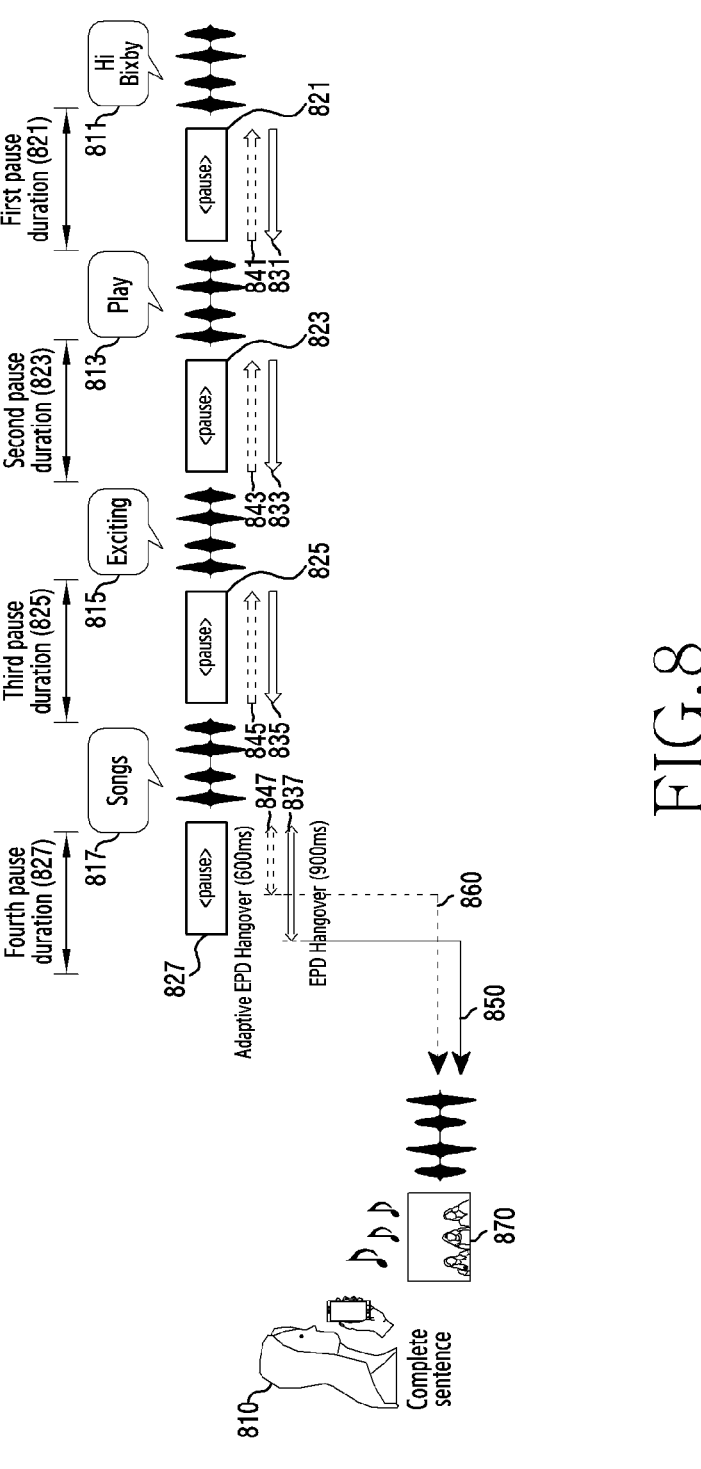
FIG. 8 is a diagram illustrating an example of an operation based on an utterance type in an electronic device, according to various embodiments.

FIG. 8 is a diagram illustrating an example of an operation based on an utterance type in an electronic device (e.g., the electronic device 101 of FIG. 1), according to various embodiments.

A case where a user utters a complete sentence including four syntactic words 811, 813, 815, and 817, e.g., "Hi Bixby play exciting songs" is assumed in FIG. 8. Each of the four syntactic words 811, 813, 815, and 817 may be recognized as a partial text. First to third pause durations 821, 823, and 825 may exist between the four syntactic words 811, 813, 815, and 817, e.g., between partial texts, and a fourth pause duration 827 may exist after a last syntactic word (or a last partial text).

The electronic device 101 may analyze each of a first partial text based on the first syntactic word "Hi Bixby" 811 recognized sequentially and a second partial text based on the second syntactic word "play" 813, and may identify that an utterance type is an incomplete sentence. As a result, the electronic device 101 may determine a hangover time 841 after the first partial text or a hangover time 843 after the second partial text to be 1800 ms longer than 900 ms which is a reference hangover time 831 or 833.

The electronic device 101 may analyze a third partial text recognized by the third syntactic word "exciting" 815 recognized sequentially, and may identify that an utterance type is an incomplete sentence by further considering previously analyzed first and second partial texts. As a result, the electronic device 101 may determine a hangover time 845 after the third partial text to be 900 ms which is a reference hangover time 835.

The electronic device 101 may analyze a fourth partial text recognized by the fourth syntactic word "songs" 817 extracted sequentially, and then may identify that an utterance type is a complete sentence by further considering previously analyzed first, second, and third partial texts. As a result, the electronic device 101 may determine a hangover time 847 after the fourth partial text to be 600 ms shorter than 900 ms which is a reference hangover time 837. When 600 ms which is the hangover time 847 elapses after the fourth partial text, the electronic device 101 may confirm that the utterance ends by recognizing a user utterance context. Thereafter, the electronic device 101 performs a quick utterance end process so that a quick response corresponding to a user request is processed (operation 860) and a result thereof is provided to a user (operation 870). If the hangover time is not adaptively determined based on the utterance type, since the end of the utterance is confirmed when the reference hangover time, e.g., 900 ms, elapses, a response process in response to the user request may be delayed (operation 850).

Figure 9:
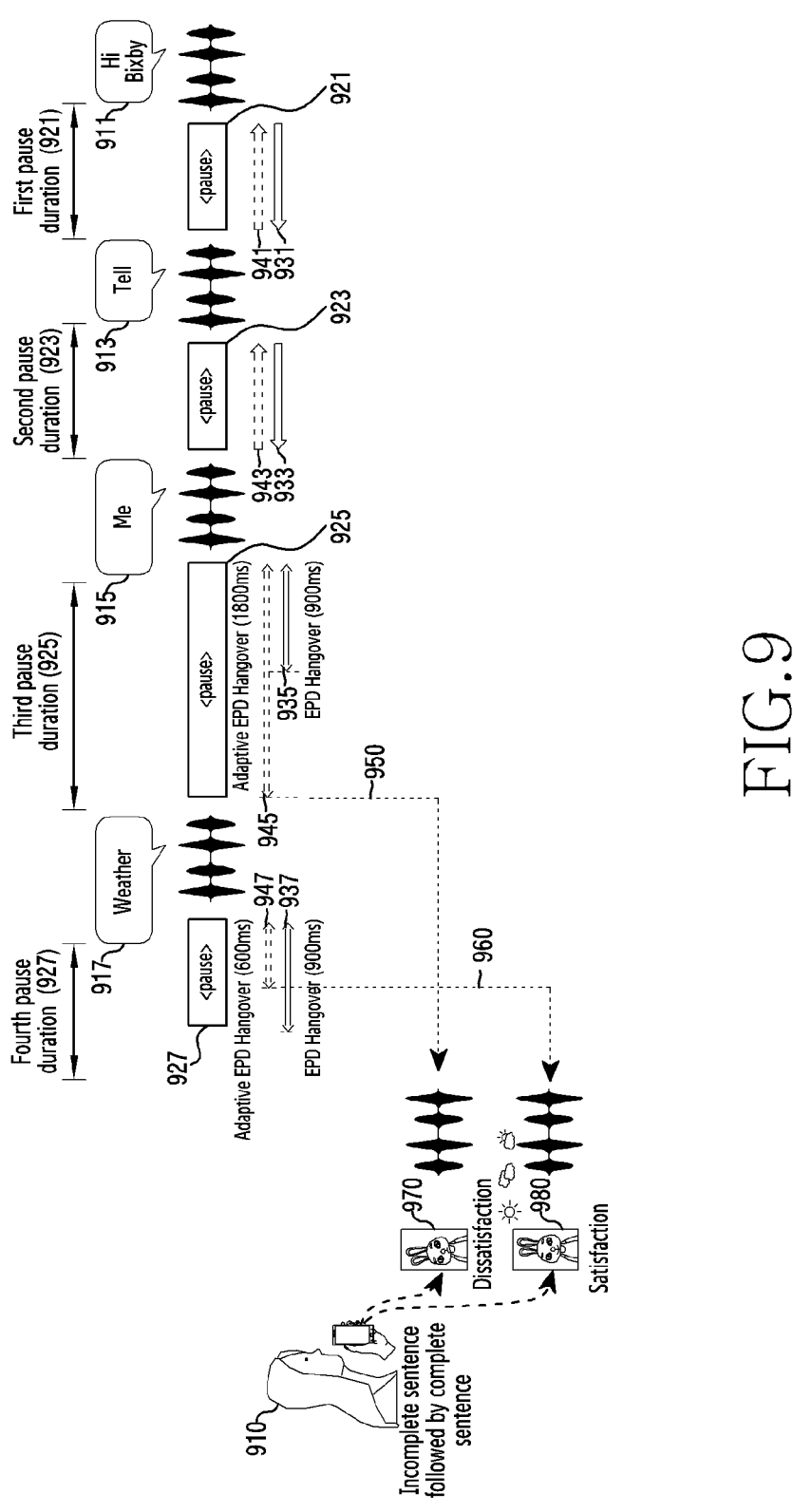
FIG. 9 is a diagram illustrating an example of an operation based on an utterance type in an electronic device, according to various embodiments.

FIG. 9 is a diagram illustrating an example of an operation based on an utterance type in an electronic device (e.g., the electronic device 101 of FIG. 1), according to various embodiments.

A case where a user utters a complete sentence including four syntactic words 911, 913, 915, and 917, e.g., "Hi Bixby tell me weather" is assumed in FIG. 9. Each of the four syntactic words 911, 913, 915, and 917 may be recognized as a partial text. First to third pause durations 921, 923, and 925 may exist between the four syntactic words 911, 913, 915, and 917, e.g., between partial texts, and a fourth pause duration 927 may exist after a last syntactic word (or a last partial text).

The electronic device 101 may analyze each of a first partial text based on the first syntactic word "Hi Bixby" 911 recognized sequentially and a second partial text based on the second syntactic word "tell" 913, and may identify that an utterance type is an ambiguous sentence. As a result, the electronic device 101 may determine a hangover time 941 or 943 after the first and second partial texts to be 900 ms which is a reference hangover time 931 or 933.

The electronic device 101 may analyze a third partial text recognized by the third syntactic word "me" 915 recognized sequentially, and may identify that an utterance type is an ambiguous sentence by further considering previously analyzed first and second partial texts. As a result, the electronic device 101 may determine a hangover time 945 after the third partial text to be 1800 ms longer than 900 ms which is a reference hangover time 935. If the hangover time is not adaptively determined based on the utterance type, since a voice signal corresponding to the fourth syntactic word "weather" 917 is not detected when the reference hangover time, e.g., 900 ms, elapses after the third partial text, the electronic device 101 may end a speech recognition process (operation 950). This will provide the user with an unsatisfactory result (operation 970).

The electronic device 101 may analyze a fourth partial text recognized by the fourth syntactic word "weather" 917 before an adjusted hangover time 945 elapses after the third partial text, and then may identify that the utterance type is the complete sentence by further considering the previously analyzed first, second, and third partial texts. As a result, the electronic device 101 may determine a hangover time 947 after the fourth partial text to be 600 ms shorter than 900 ms which is a reference hangover time 937. When 600 ms which is the hangover time 947 elapses after the fourth partial text, the electronic device 101 may confirm that the utterance ends by recognizing a user utterance context. Thereafter, the electronic device 101 performs a quick utterance end process so that a quick response corresponding to a user request is processed (operation 960) and a satisfactory result thereof is provided to a user (operation 980). If the hangover time is not adaptively determined based on the utterance type, since the end of the utterance is confirmed when the reference hangover time, e.g., 900 ms, elapses, a response process in response to the user request may be delayed.

According to the example described above with reference to FIG. 8 and FIG. 9, since EPD rapidly ends when a user's utterance ends, a quick response may be ensured in speech recognition. If it is necessary to wait a little longer by considering a user's utterance context, the uttered sentence is listened to the end by waiting for a user's subsequent utterance, thereby increasing user's satisfaction.

Figure 10:
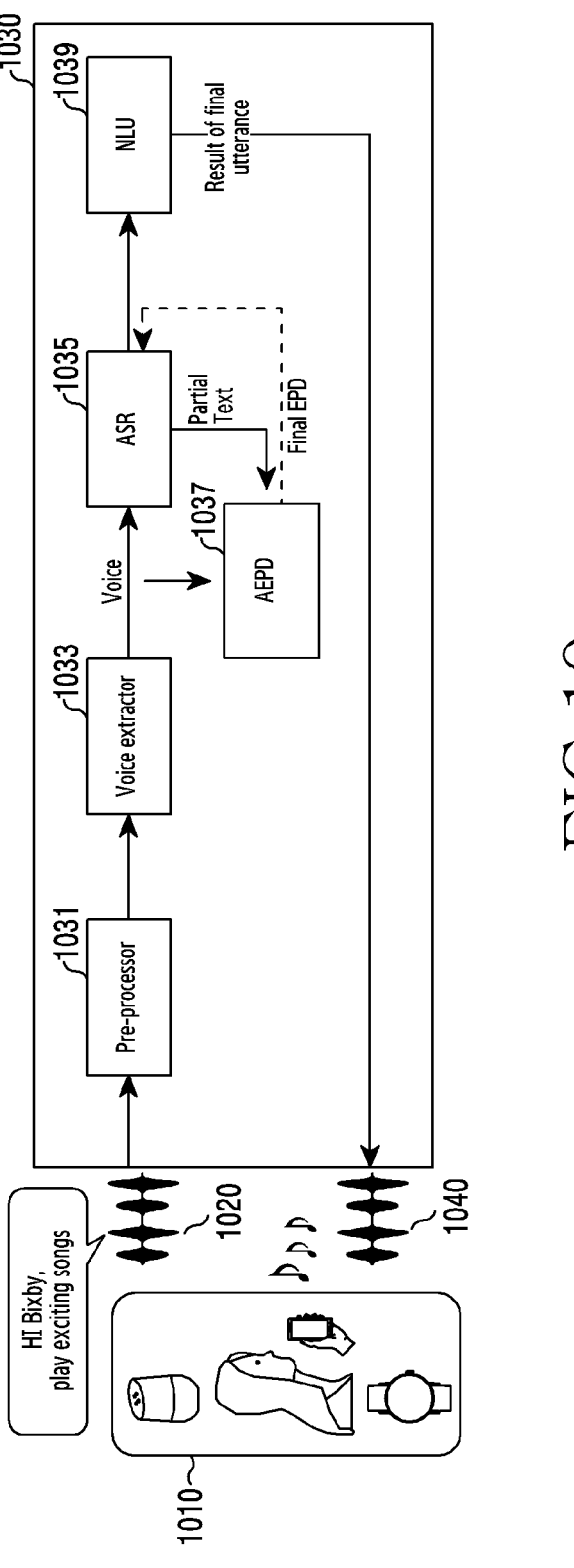
FIG. 10 is a diagram illustrating an example configuration of performing an operation based on speech recognition in an electronic device, according to various embodiments.

FIG. 10 is a diagram illustrating an example configuration of performing an operation based on speech recognition in an electronic device (e.g., the electronic device 101 of FIG. 1), according to various embodiments.

Referring to FIG. 10, the configuration (hereinafter, a 'speech processing device 1030') of performing the operation based on speech recognition in the electronic device 101 may include various modules including a pre-processor 1031, a voice extractor 1033, an Automatic Speech Recognition (ASR) 1035, an Adaptive End Point Detection (AEPD) 1037, and/or a Natural Language Understanding (NLU) 1039. Each of the modules may include various processing circuitry and/or executable program instructions.

A voice signal 1020 generated by an utterance of a user 1010 may be input to the speech processing device 1030. It is assumed in the drawing that a voice signal which is a natural language of 'hi bixby play exciting songs' is input by the utterance of the user 1010 to a microphone included in the electronic device. In this case, the microphone may convert the input voice signal into an audio signal which is an electrical signal and transmit it as an input of the pre-processor 1031.

The pre-processor 1031 may pre-process the audio signal, which is the electrical signal, for speech recognition. The pre-processor 1031 may remove, for example, noise such as ambient noise other than a user's voice included in the audio signal.

An audio signal subjected to pre-processing by the pre-processor 1031 may be provided as an input to the voice extractor 1033. The voice extractor 1033 may extract a voice signal uttered by a user from the pre-processed audio signal, and may output the extracted voice signal. The voice signal output by the voice extractor 1033 may be a pure natural language to be used for speech recognition. The voice signal extracted by the voice extractor 1033 may be transferred to at least one of the ASR 1035 and the AEPD 1037.

The ASR 1035 may recognize a partial text by analyzing the voice signal transferred from the voice extractor 1033. The ASR 1035 may analyze, for example, the voice signal transferred from the voice extractor 1033, on a real-time basis, based on a specific unit such as a syntactic word, and may sequentially output partial texts obtained as the analyzed result on the real-time basis. The partial text recognized by the ASR 1035 through analysis may be transferred to the AEPD 1037.

The AEPD 1037 may identify an utterance type for a text analyzed up to now by the ASR 1035, based on the partial text transferred from the ASR 1035. The utterance type which may be identified by the AEPD 1037 may be one of the complete sentence, the incomplete sentence, and the ambiguous sentence, as defined above. The AEPD 1037 may adaptively determine a hangover time by considering the identified utterance type.

The AEPD 1037 may monitor the voice signal transferred from the voice extractor 1033 to determine whether a voice exists or not. The AEPD 1037 may apply the determined hangover time to detect whether a user's utterance ends in the voice signal transferred from the voice extractor 1033.

For example, when a pause state in which the voice does not exist in the voice signal extracted by the voice extractor 1033 is maintained for the hangover time, the AEPD 1037 may determine that the user's utterance ends. Upon determining that the user's utterance ends, the AEPD 1037 may notify the ASR 1035 of the end of the utterance.

According to an embodiment, when a sentence is complete by a partial text previously transferred and/or a partial text newly transferred from the ASR 1035, the AEPD 1037 may adjust the hangover time to be shorter than a reference hangover time to notify the ASR 1035 of the end of the utterance more rapidly.

According to an embodiment, when the sentence is not complete by the partial text previously transferred and/or the partial text newly transferred by the ASR 1035, the AEPD 1037 may adjust the hangover time to be longer than the reference hangover time to notify the ASR 1035 of the end of the utterance more conservatively (or to be delayed).

According to an embodiment, when it is not possible to determine that the sentence is complete or incomplete by the partial text previously transferred and/or the partial text newly transferred by the ASR 1035, the AEPD 1037 may maintain the reference hangover time.

In various embodiments described above, in order to analyze the utterance type for the voice signal analyzed by the ASR 1035, the AEPD 1037 may refer to a computation result for one or more partial texts previously transferred from the ASR 1035 together with the computation result for the partial text newly transferred from the ASR 1035. The AEPD 1037 may use, for example, an RNN-based deep-learning model in which sequential data processing is possible on a text basis. The RNN-based deep-learning model may be prepared based on a GRU computation.

According to an embodiment, the AEPD 1037 may start the GRU computation at a time point of generating the partial text provided from the ASR 1035 when performing deep-learning, process a computation part for a previous partial text using a previously calculated value, and calculate only the partial text newly provided from the ASR 1035.

Upon recognizing that the user's utterance ends from the AEPD 1037, the ASR 1035 may stop analyzing the voice signal provided from the voice extractor 1033. The ASR 1035 may provide the NLU 1039 with a full text analyzed until the end of the utterance is recognized after the utterance starts.

The NLU 1039 may perform natural language analysis for a full text provided from the ASR 1035, and may output a result of final utterance 1040 so that an operation considering a user's context is performed based on the analysis result.

As described above, the electronic device 101 according to various embodiments may basically detect a speech duration and/or a pause duration through a voice-based model when a user utterance is made, and may recognize a user's utterance context to adaptively adjust a hangover time for determining an end of the utterance, based on an utterance type corresponding to one of a complete sentence, an uncomplete sentence, and an ambiguous sentence. The electronic device 101 may stop audio recording at a time point of recognizing the end of the utterance, generate a final text through automatic speech recognition, and use the final text to perform an operation desired by a user through an NLP task. In this case, the electronic device 101 may provide the user with a voice assistant service such as a chatbot more rapidly and accurately.

Figure 11:
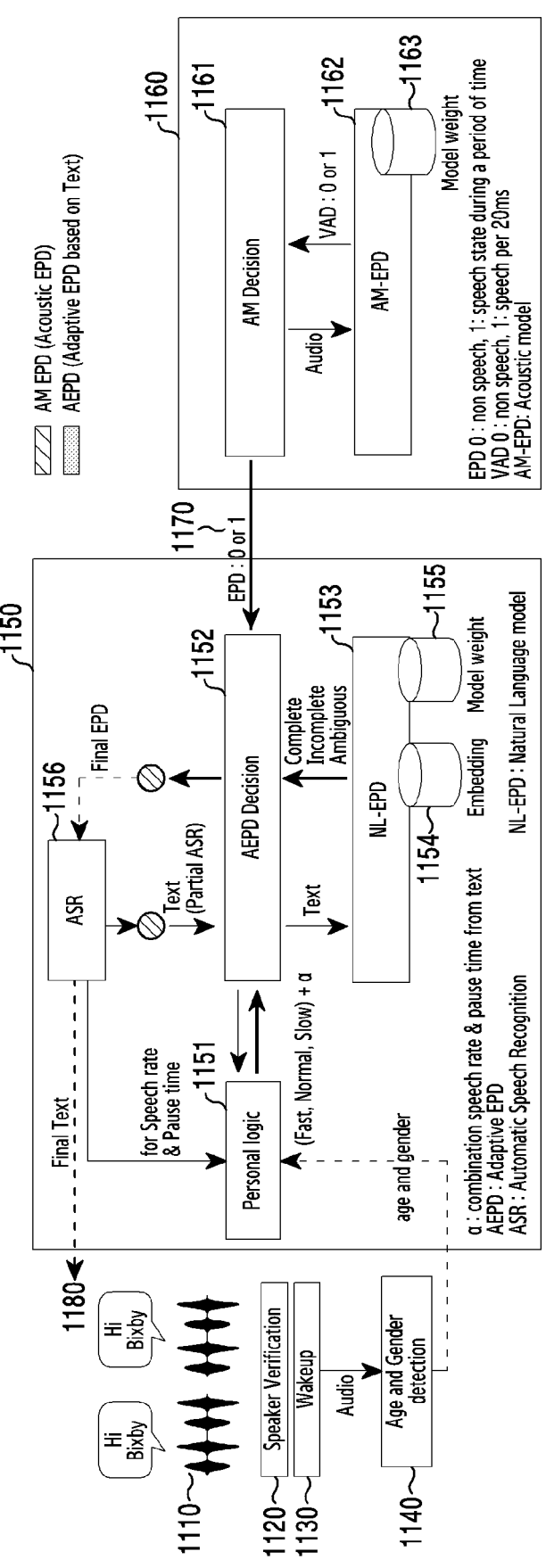
FIG. 11 is a diagram illustrating an example configuration in which speech recognition is performed in an electronic device, according to various embodiments.

FIG. 11 is a diagram illustrating an example configuration in which speech recognition is performed in an electronic device (e.g., the electronic device 101 of FIG. 1), according to various embodiments.

Referring to FIG. 11, a device which recognizes a voice (hereinafter, referred to as a 'voice recognition device') in the electronic device 101 may include a voice analysis module 1150 and/or a voice break detection module 1160. The voice analysis module 1150 may include various modules including a personal logic 1151, an AEPD logic (AEPD Decision) 1152, a natural language model (NL-EPD) 1153, an embedding 1154, a model weight 1155, and/or an ASR 1156. The voice break detection module 1160 may include various modules including an Acoustic Model (AM) decision logic 1161, an AM-EPD logic 1162, and/or a model weight 1163. Each of the modules may include various processing circuitry and/or executable program instructions.

According to an embodiment, a speaker verification operation (operation 1120) may be performed so that a voice signal 1110 generated by a user's utterance is used for a specified function such as a voice assistant service. For example, the speaker verification operation may be performed based on a speaker recognition function, or may be performed using voice data transferred when a wake-up is performed. An age and/or gender classification for the speaker may be performed in the speaker verification operation. For example, after the specified function such as the voice assistant service is activated (operation 1130), the voice signal 1110 generated due to the utterance may be used to determine a characteristic such as the speaker's age or gender (operation 1140).

The voice analysis module 1150 may recognize a partial text sequentially from the voice signal 1110 generated by the user's utterance, and may identify an utterance type, based on the recognized partial text. The voice analysis module 1150 may determine whether an utterance ends by referring to the identified utterance type and speaker characteristic information such as the speaker's age, gender, speech rate, or pause time. Upon detecting the end of the utterance, the voice analysis module 1150 may output a final text which is an automatic recognition result for the voice signal 1110.

According to an embodiment, at least one of the speaker's age, gender, speech rate, and pause time is provided to the personal logic 1151. Based on this, user characteristic information to be referred to determine a hangover time for the partial text may be provided to the AEPD logic 1152. The AEPD logic 1152 may transfer to the NL-EPD 153 the partial text provided from the ASR 1156. The NL-EPD 1153 may analyze the partial text transferred from the AEPD logic 1152, may determine to which sentence an utterance type corresponds among a complete sentence, an incomplete sentence, and an ambiguous sentence, based on the analysis result, and may provide the determination result to the AEPD logic 1152. The analysis result based on the NL-EPD 1153 may be subjected to deep-learning or recording by means of the embedding 1154 or the model weight 1155. Whether there is a voice signal (EPD: 0 or 1) detected from the voice break detection module 1160 may be provided to the AEPD logic 1152 (operation 1170).

Specifically, in the operation performed in the voice break detection module 1160, the AM decision logic 1161 may transfer an audio signal caused by a user's utterance to the AM-EPD logic 1162. The AM-EPD logic 1162 may access the model weight 1163 to determine whether an acoustic signal exists in the audio signal, and may provide the determination result (VAD: 0 or 1) to the AM decision logic 1161. The AM decision logic 1161 may determine information (e.g., EPD) indicating an acoustic state during a time period, based on information (e.g., VAD) identifying whether there is an acoustic signal for each specific duration (e.g., 20 ms) provided by the AM-EPD logic 1162. The AM decision logic 1161 may provide the AEPD logic 1152 with the information (e.g., EPD) indicating the acoustic state during the determined time period.

The AEPD logic 1152 may determine a hangover time to be applied to determine a voice activity end time point, based on the user characteristic information provided from the personal logic 1151 and the utterance type provided from the NL-EPD 1153. After providing an identifier indicating that a pause duration in which an audio signal does not exist is detected from the voice break detection module 1160, if it is not identified that the audio signal exists from the voice break detection module 1160 until the hangover time elapses, the AEPD logic 1152 may confirm the end of the utterance. The AEPD logic 1152 may notify the ASR 1156 of the end of the utterance. When the end of the utterance is reported from the AEPD logic 1152, the ASR 1156 may generate a full text based on partial texts analyzed until the end of the utterance is reported, and may transfer the full text to the input 1180 for natural language analysis.

Figure 12:
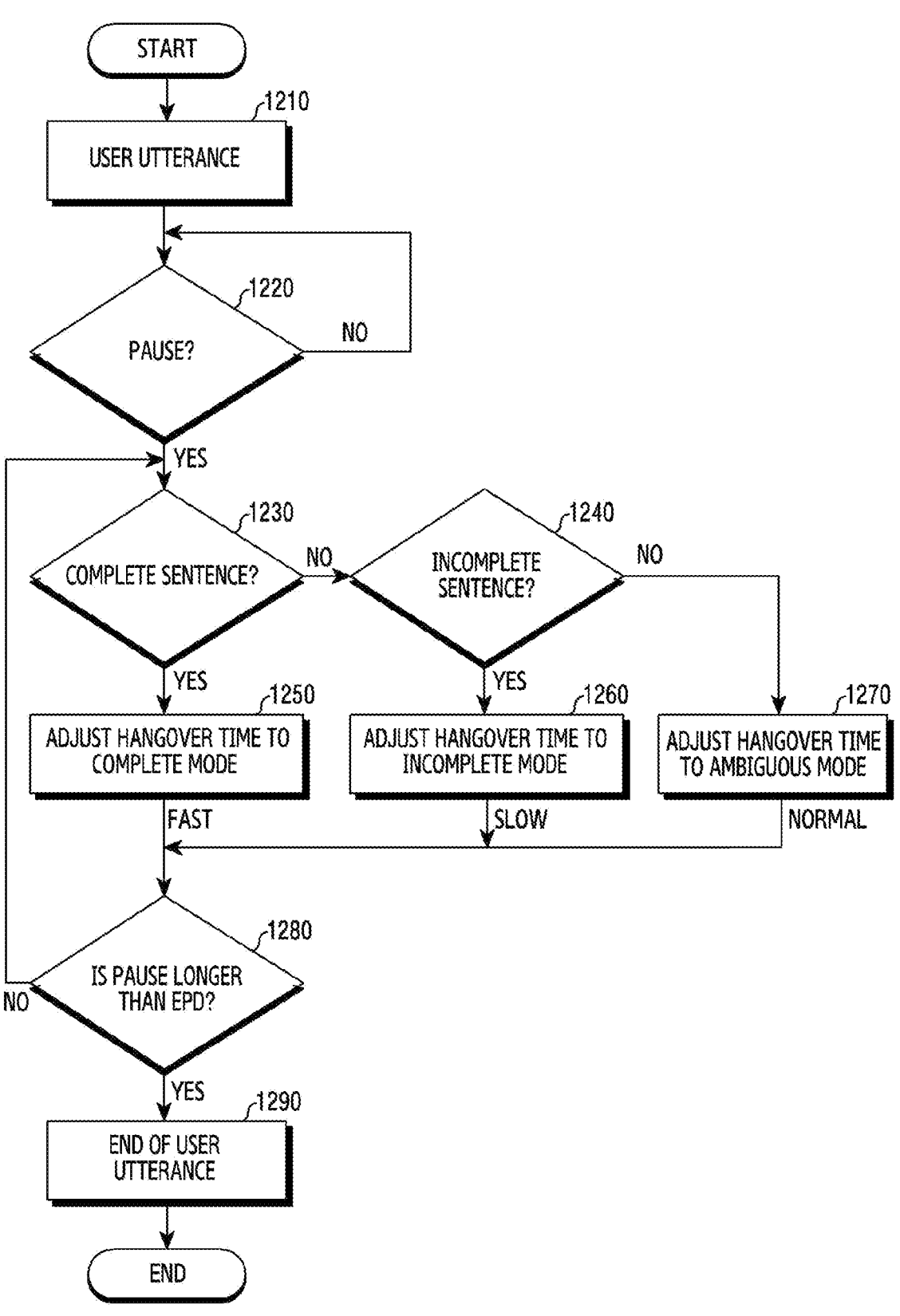
FIG. 12 is a flowchart illustrating an example method of detecting an end of user's utterance in an electronic device, according to various embodiments.

FIG. 12 is a flowchart illustrating an example operation for detecting an end of a user's utterance in an electronic device (e.g., the electronic device 101 of FIG. 1), according to various embodiments.

Referring to FIG. 12, in operation 1210 according to an embodiment, the electronic device 101 may recognize that the user's utterance is initiated by an audible signal which is input from the outside. Upon detecting the user's utterance, the electronic device 101 may convert the audible signal input caused by the user's utterance into an audio signal, extract the audio signal after performing pre-processing on the audio signal, and perform speech recognition on the extracted audio signal to sequentially obtain partial texts.

In operation 1220 according to an embodiment, the electronic device 101 may monitor whether a pause occurs in the extracted audio signal. The pause in the voice signal may occur between one syntactic word and another due to a characteristic of a user's utterance or an end of the user's utterance.

In operation 1230 according to an embodiment, the electronic device 10 may determine whether a sentence for one or more partial texts obtained until the pause occurs is a complete sentence. For example, upon determining that it is possible to identify a user's context through analysis of one or more partial texts obtained up to now without a text input through speech recognition any longer, the electronic device 101 may determine that an utterance type is a complete sentence. In this case, in operation 1250, the electronic device 101 may adjust the hangover time to a hangover time corresponding to a complete mode. The hangover time (e.g., 600 ms) corresponding to the complete mode may be shorter than a default hangover time (e.g., 900 ms) set in the electronic device 101. The electronic device 101 may further consider user characteristic information when determining the hangover time (e.g., 600 ms) corresponding to the complete mode. When a user's speech rate is fast, the hangover time may be determined to be shorter than the hangover time (e.g., 600 ms) corresponding to the complete mode, for example, determined to be 400 ms. When the user's speech rate is slow, the hangover time may be determined to be longer than the hangover time (e.g., 600 ms) corresponding to the complete mode, for example, determined to be 800 ms. When the user's speech rate is normal, the hangover time may be determined to be equal to the hangover time (e.g., 600 ms) corresponding to the complete mode.

In operation 1240 according to an embodiment, the electronic device 101 may determine whether a sentence based on one or more partial texts obtained until a pause occurs is an ambiguous sentence. For example, upon determining that it is necessary to obtain an additional partial text through speech recognition since it is not possible to identify a user's context through analysis of one or more partial texts obtained up to now, the electronic device 101 may determine that the utterance type is an incomplete sentence. In this case, in operation 1260, the electronic device 101 may adjust the hangover time to a hangover time corresponding to an incomplete mode. The hangover time (e.g., 1800 ms) corresponding to the incomplete mode may be longer than a default hangover time (e.g., 900 ms) set in the electronic device 101. The electronic device 101 may further consider user characteristic information when determining the hangover time (e.g., 1800 ms) corresponding to the incomplete mode. When a user's speech rate is fast, the hangover time may be determined to be shorter than the hangover time (e.g., 1800 ms) corresponding to the incomplete mode, for example, determined to be 1300 ms. When the user's speech rate is slow, the hangover time may be determined to be longer than the hangover time (e.g., 1800 ms) corresponding to the incomplete mode, for example, determined to be 2500 ms. When the user's speech rate is normal, the hangover time may be determined to be equal to the hangover time (e.g., 1800 ms) corresponding to the incomplete mode.

In operations 1230 and 1240 according to an embodiment, if the utterance type does not correspond to the complete sentence or the incomplete sentence, the electronic device 101 may determine that the utterance type is an ambiguous sentence. In this case, in operation 1270, the electronic device 101 may adjust the hangover time to a hangover time corresponding to the ambiguous mode. The hangover time (e.g., 900 ms) corresponding to the ambiguous mode may be equal to a default hangover time (e.g., 900 ms) set in the electronic device 101. The electronic device 100 may further include user characteristic information when determining the hangover time (e.g., 900 ms) corresponding to the ambiguous mode. When a user's speech rate is fast, the hangover time may be determined to be shorter than the hangover time (e.g., 900 ms) corresponding to the ambiguous mode, for example, determined to be 700 ms. When the user's speech rate is slow, the hangover time may be determined to be longer than the hangover time (e.g., 900 ms) corresponding to the ambiguous mode, for example, determined to be 1100 ms. When the user's speech rate is normal, the hangover time may be determined to be equal to the hangover time (e.g., 900 ms) corresponding to the ambiguous mode.

In operation 1280 according to an embodiment, the electronic device 101 may monitor whether a pause is maintained for more than the determined hangover time in the extracted voice signal. If a pause state is released before the hangover time elapses, returning to operation 1230, the electronic device 101 may identify again the utterance type by considering a newly obtained partial text. If the pause state is maintained until the hangover time elapses, proceeding to operation 1290, the electronic device 101 may determine that the user's utterance ends.

Figure 13:
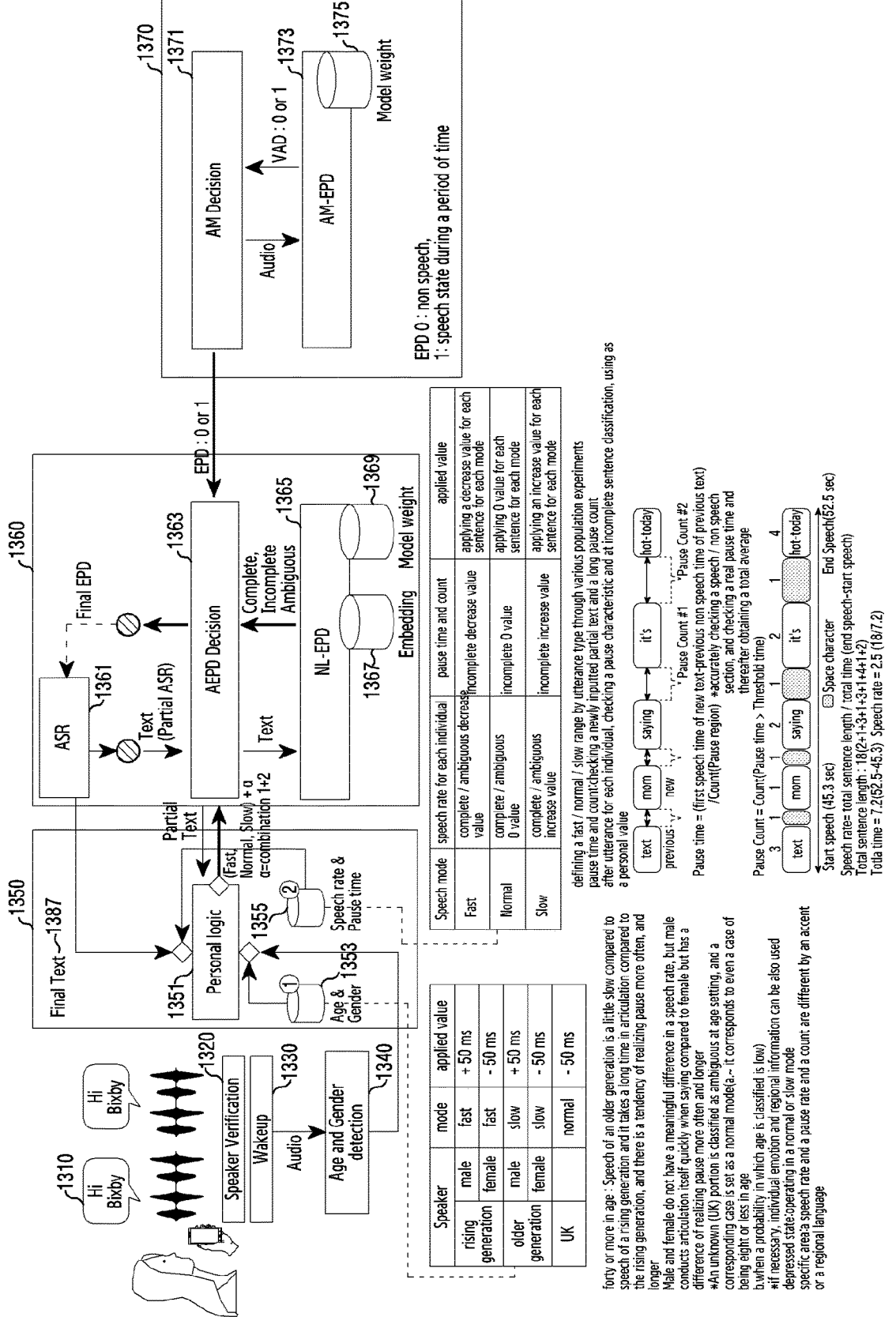
FIG. 13 is a diagram illustrating an example configuration of performing speech recognition in an electronic device, according to various embodiments.

FIG. 13 is a diagram illustrating an example configuration of performing speech recognition in an electronic device (e.g., the electronic device 101 of FIG. 1), according to various embodiments.

Referring to FIG. 13, a device which recognizes a voice (hereinafter, referred to as a 'voice recognition device') in the electronic device 101 may include a user state detection module 1350, a voice recognition module 1360, and/or a voice break detection module 1370 (e.g., the voice break detection module 1160 of FIG. 11). The user state detection module 1350 and the voice recognition module 1360 may include the voice analysis module 1150 of FIG. 11. The user state detection module 1350 may include a personal logic 1351, a first database 1353, and/or a second database 1355. The voice recognition module 1360 may include an ASR 1361, an AEPD logic 1363, an NL-EPD 1365, an embedding 1367, and/or a model weight 1369. The voice break detection module 1370 may include an Acoustic Model (AM) decision logic 1371, an AM-EPD logic 1373, and/or a model weight 1375. The various modules listed above may include various processing circuitry and/or executable program instructions.

According to an embodiment, a speaker verification operation (operation 1320) may be performed so that a voice signal 1310 generated by a user's utterance is used for a specified function such as a voice assistant service. For example, the speaker verification operation may be performed based on a speaker recognition function, or may be performed using voice data transferred when a wake-up is performed. An age and/or gender classification for the speaker may be performed in the speaker verification operation. For example, after the specified function such as the voice assistant service is activated (operation 1330), the voice signal 1310 generated due to the utterance may be used to determine a characteristic such as the speaker's age or gender (operation 1340).

A partial text recognized sequentially from the voice signal 1310 generated by the user's utterance may be provided to the user state detection module 1350 by the voice recognition module 1360. At least one of the speaker's age, gender, speech rate, and pause time is provided to the user state detection module 1350. Based on this, user characteristic information to be referred to determine a hangover time for the partial text may be provided to the voice recognition module 1360.

According to an embodiment, the personal logic 1351 may have a detection module (not shown) based on deep-learning for classifying the age and/or the gender and a routine (not shown) for checking a speech rate of users. The personal logic 1351 may check a speech rate per user and/or a pause time and count per speech, based on at least one of the partial text and full text transferred through the ASR 1361. For example, the personal logic 1351 may take an average of a specific number of times (e.g., about first 10 times), and may check the speech rate and the pause time and count between utterances, based on the taken average value. The personal logic 1351 may set an applied value (e.g., a value α) corresponding to a user characteristic value to 0 until user characteristic information is checked. The personal logic 1351 may have the first database 1353 which manages a user characteristic value to be referred to determine a hangover time for a partial text, based on user's age and gender determined internally. The personal logic 1351 may have the second database 1355 which manages the user characteristic value to be referred to determine a hangover time for a partial text, based on the user's age and gender determined internally. The personal logic 1351 may classify a user characteristic, based on data managed in the first database 1351 and second database 1355, and may determine a final applied value (e.g., alpha value) by considering a result of the classification. The user characteristic may be classified into, for example, fast, normal, and slow modes. When the personal logic 1351 determines the final applied value (e.g., alpha value), the applied value (e.g., alpha value) may be determined to be different even if a mode corresponding to the user characteristic is the same. That is, the final applied value (e.g., alpha value) may be different to some extends even in the same mode. After the speech rate is checked, the personal logic 1351 may no longer operate for a corresponding mode, and may persistently use the set alpha values (e.g., $\alpha 1$, $\alpha 2$, and $\alpha 3$).

According to an embodiment, the electronic device 101 may use the first database 1353 which defines a user characteristic value (e.g., an applied value) pre-set based on a speaker's age group and gender as shown in Table 3 below.

TABLE 3

| | generation | mode | an applied value |
|---|---|---|---|
| A rising generation | male | fast | +50 ms |
| | female | fast | −50 ms |
| An older generation | male | slow | +50 ms |
| | female | slow | −50 ms |
| UK(unknown) | — | normal | +0 ms |

Table 3 above may include an applied value generated based on that a speech of an older generation is a relatively slow compared to a rising generation and it takes a relatively long time in articulation, and there is a tendency of realizing a pause relatively more often and/or longer. In addition, it is possible to include an applied value generated based on that male and female do not have a meaningful difference in a speech rate, but male conducts articulation itself quickly when saying compared to female but has a difference of realizing the pause relatively more often and longer.

In Table 3 above, an Unknown (UK) part not classified as the old generation or the rising generation may be included. The UK part may include an applied value set to a normal mode. According to an embodiment, it may be classified as the UK when the speaker's age group is less than 8 or when a probability that age is classified is low. Although it is not considered in Table 3 above, if necessary, individual emotion and regional information may also be considered additionally. For example, a normal or slow mode may be applied to a depressed state, and an accent or a regional language may also be considered since a speech rate and a pause rate and count may be different.

Table 4 below shows an example of the second database 1355 which defines a user characteristic value (e.g., an applied value) pre-set based on the speaker's speech rate and pause time.

TABLE 4

| speech mode | an individual speed rate | pause time and pause count | an applied value |
|---|---|---|---|
| Fast | Complete/ambiguous decrease value | incomplete decrease value | Applied decrease value for each sentence/mode |
| Normal | Complete/ambiguous zero value | incomplete zero value | Applied zero value for each sentence/mode |
| slow | Complete/ambiguous increase value | incomplete increase value | Applied increase value for each sentence/mode |

Table 4 above defines a value of a fast/normal/slow range for each utterance type through various population experiments. A pause time and count is to check a duration of a partial text newly input and a long pause count, and may be defined to be used as a personal value when it is classified as an incomplete sentence by checking a pause characteristic after a speech for each individual.

The personal logic 1351 may provide the AEPD logic 1363 with user characteristic information to be referred to determine a hangover time for a partial text. The AEPD logic 1363 may transfer to the NL-EPD 1365 the partial text provided from the ASR 1361. The NL-EPD 1365 may analyze the partial text transferred from the AEPD logic 1363, may determine to which sentence an utterance type corresponds among a complete sentence, an incomplete sentence, and an ambiguous sentence, based on the analysis result, and may provide the determination result to the AEPD logic 1363. The analysis result based on the NL-EPD 1365 may be subjected to deep-learning or recording by means of the embedding 1367 or the model weight 1369. Whether there is a voice signal (EPD: 0 or 1) detected from the voice break detection module 1370 may be provided to the AEPD logic 1363.

The voice recognition module 1360 may determine whether an utterance ends by referring to the identified utterance type and speaker characteristic information such as the speaker's age, gender, speech rate, or pause time. Upon detecting the end of the utterance, the voice recognition module 1360 may output a final text which is an automatic recognition result for the voice signal.

In relation to the operation in the voice break detection module 1370, the AM decision logic 1371 may transfer an audio signal caused by a user's utterance to the AM-EPD logic 1373. The AM-EPD logic 1373 may access the model weight 1375 to determine whether an acoustic signal exists in the audio signal, and may provide the determination result (VAD: 0 or 1) to the AM decision logic 1371. The AM decision logic 1371 may determine information (e.g., EPD) indicating an acoustic state during a time period, based on information (e.g., VAD) identifying whether there is an acoustic signal for each specific duration (e.g., 20 ms) provided by the AM-EPD logic 1373. The AM decision logic 1371 may provide the AEPD logic 1363 with the information (e.g., EPD) indicating the acoustic state during the determined time period.

The AEPD logic 1363 may determine a hangover time to be applied to determine a voice activity end time point, based on the user characteristic information provided from the personal logic 1351 and the utterance type provided from the NL-EPD 1365. After providing an identifier indicating that a pause duration in which an audio signal does not exist is detected from the voice break detection module 1370, if it is not identified that the audio signal exists from the voice break detection module 1370 until the hangover time elapses, the AEPD logic 1363 may confirm the end of the utterance. The AEPD logic 1363 may notify the ASR 1361 of the end of the utterance. When the end of the utterance is reported from the AEPD logic 1363, the ASR 1361 may generate a full text based on partial texts analyzed until the end of the utterance is reported, and may transfer the full text to the input 1387 for natural language analysis.

Figure 14:
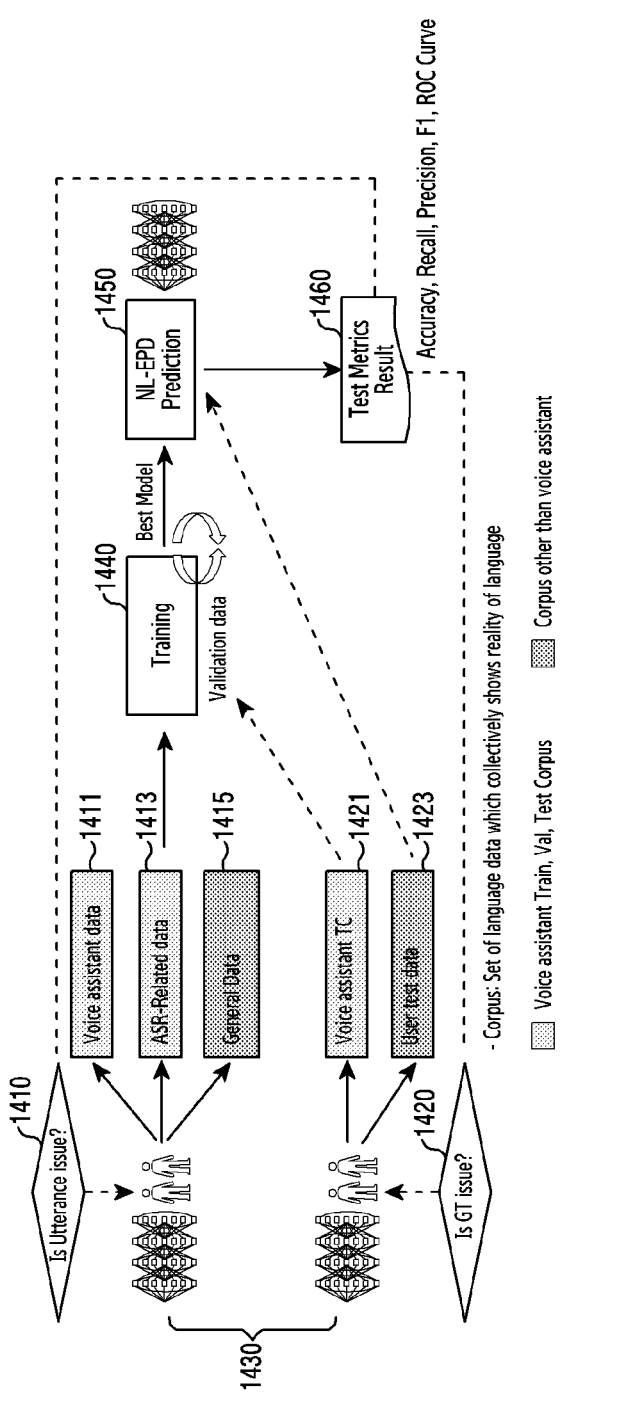
FIG. 14 is a flow diagram illustrating example model learning for supporting speech recognition in an electronic device, according to various embodiments.

FIG. 14 is a diagram illustrating an example flow of model learning for supporting speech recognition in an electronic device (e.g., the electronic device 101 of FIG. 1), according to various embodiments.

Referring to FIG. 14, upon detecting an utterance issue in operation 1410, the electronic device 101 may collect a user characteristic corresponding to a corpus such as a speech rate per user and a pause time and count per utterance in operation 1430. The corpus may be a set of language data which collectively shows reality of language. The electronic device 101 may classify the collected characteristic information for each user into voice assistant data 1411, ASR-related data 1413, and general data 1415, and may use the classified voice assistant data 1411, ASR-related data 1413, or general data 1415 for training based on deep-learning. For example, the general data 1415 may be used as a technical meaning collectively referring to data other than the voice assistant data and the ASR-related data.

Upon detecting a Ground Truth (GT) issue in operation 1420, the electronic device 101 may collect a user characteristic corresponding to a corpus such as a speech rate per user and a pause time and count per utterance in operation 1430. The electronic device 101 may perform an operation of correcting voice assistant or user test data by considering the collected user characteristic. The correcting operation may prevent or reduce an incorrect GT for the voice assistant or user test data from being used to validate model performance. The electronic device 101 may validate the model performance, based on a voice assistant TC 1421 or user test data 1423, and may check what is lacking in the model to facilitate improvement of the model performance.

In operation 1440, the electronic device 101 may perform training based on deep-learning according to the user characteristic information previously collected and classified. When the training is performed, the electronic device 101 may extract validation data. The electronic device 101 may use the validation data to validate the model performance, and may select a best model having good performance with respect to the validation data.

In operation 1450, the electronic device 101 may predict a user's voice activity end time point by applying the best model obtained through the training. In operation 1460, the electronic device 101 may evaluate the model performance through various test metrics, and may perform a correction and compensation operation on incorrect learning and test data, based on the evaluated result.

Figure 15:
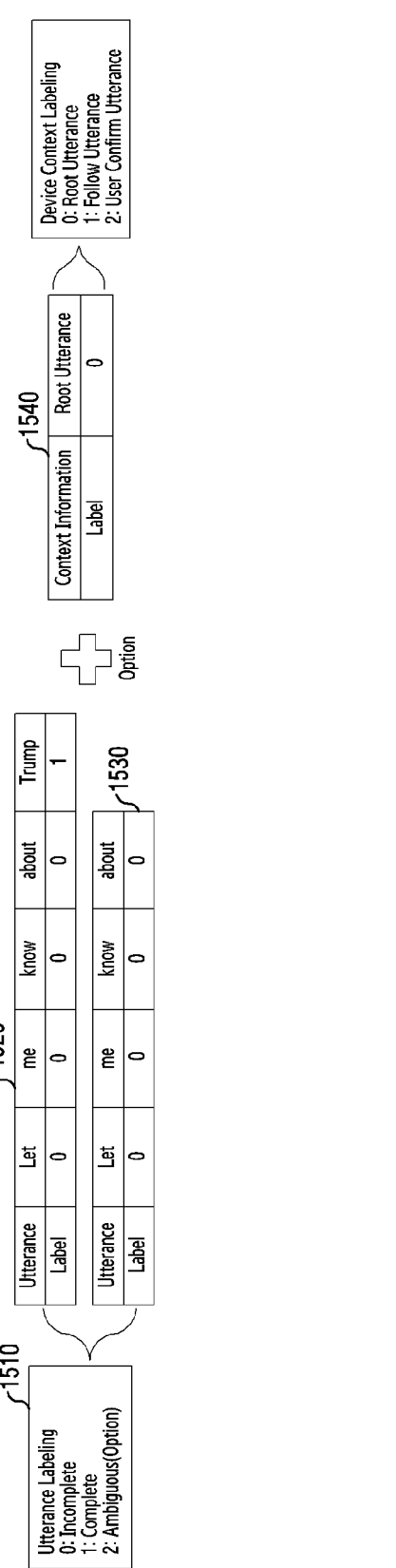
FIG. 15 is a diagram illustrating an example data format of a deep-learning model for speech recognition in an electronic device, according to various embodiments.

FIG. 15 is a diagram illustrating an example data format of a deep-learning model for speech recognition in an electronic device (e.g., the electronic device 101 of FIG. 1), according to various embodiments.

Referring to FIG. 15, in operation 1510, the electronic device 101 may classify an utterance type into one of an incomplete sentence (0: incomplete), a complete sentence (1: complete), and an ambiguous sentence (2: ambiguous) for each partial text through utterance labeling. Reference numeral 1520 indicates an example of classifying to which sentence the utterance type corresponds among the incomplete sentence (0: incomplete), the complete sentence (1: complete), and the ambiguous sentence (2: ambiguous) for each uttered partial text (e.g., Let, me, know, about Trump). Reference numeral 1530 indicates an example of classifying to which sentence the utterance type corresponds among the incomplete sentence (0: incomplete), the complete sentence (1: complete), and the ambiguous sentence (2: ambiguous) for each uttered partial text (e.g., Let, me, know, about). Optionally, the electronic device 101 may also configure a Database (DB) for ambiguous examples through learning (operation 1540).

As described above, the electronic device may be configured to operate after an audio frame is processed on a real-time basis according to an EPD characteristic. An RNN-based deep-leaning model capable of processing data sequentially may be used for development of text-based NL-EPD. For example, in order to be associated with a voice assistant service, model learning may be performed using corresponding training, validation, and/or test data. In order to classify a basic sentence type, normal corpus data may be utilized to check whether it is basically a complete sentence or not.

FIG. 14 and FIG. 15 illustrate data and label rules for model learning. Since a corresponding technique is applicable to various devices, learning and tests may be performed by collecting data related to phones, tablets, or AI speakers. A text label may basically use a label for a complete/incomplete sentence, and an internal learning model may basically provide a structure in which an ambiguous sentence value is treated as an ambiguous sentence when a probability value for being complete/incomplete does not fall within a specific range. If there is a problem in a performance issue, a structure in which the ambiguous sentence is also learned by being included in the learning level may also be supported. When an utterance is made, device context information may also be an important factor. Therefore, optionally, context information (e.g., a root utterance, a follow-up utterance, or a user confirm utterance) on a device may also be learned and processed together with the utterance.

Figure 16:
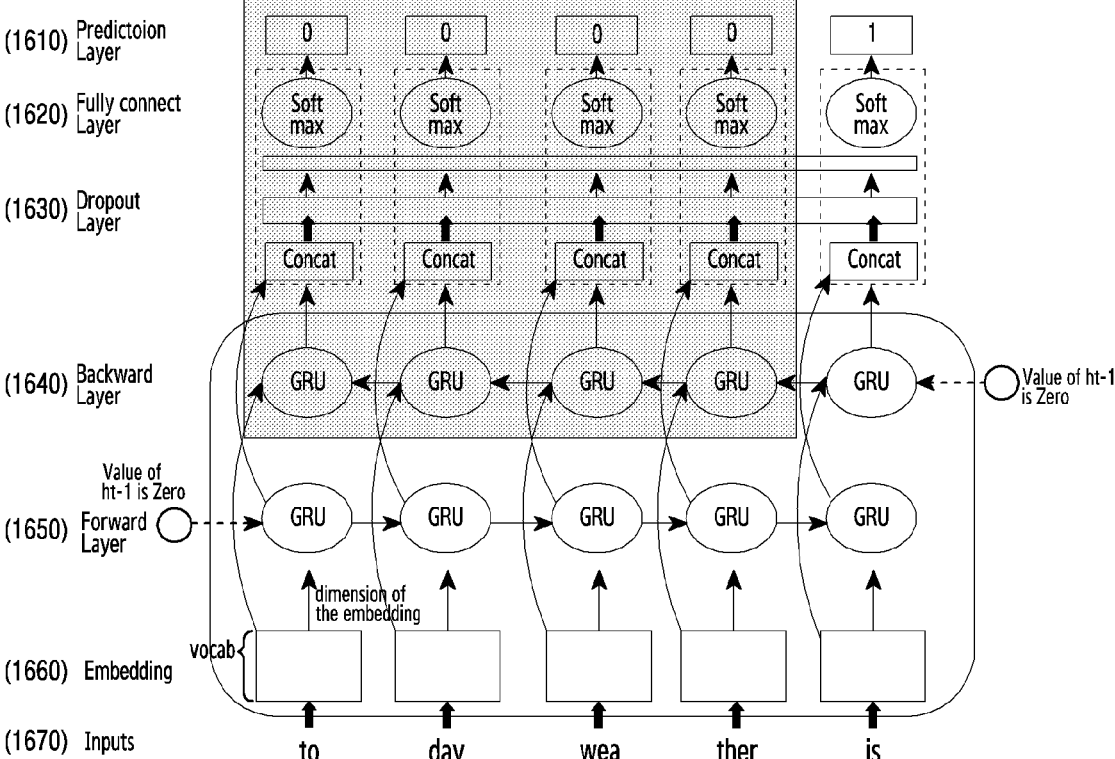
FIG. 16 is a diagram illustrating an example of an inference process after learning to cope with a real-time environment in an electronic device, according to various embodiments.
Figure 17:
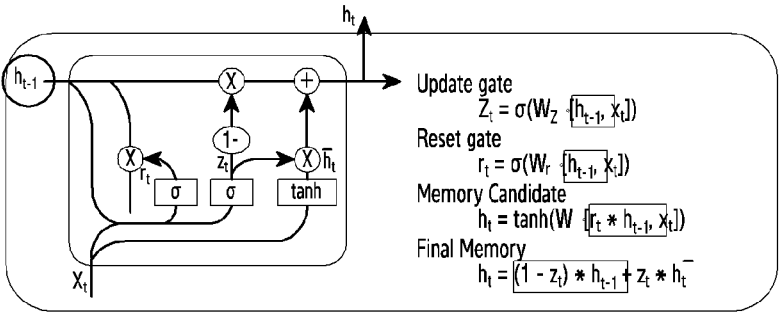
FIG. 17 is a diagram illustrating an example of an inference process after learning to cope with a real-time environment in an electronic device, according to various embodiments.
Figure 18:
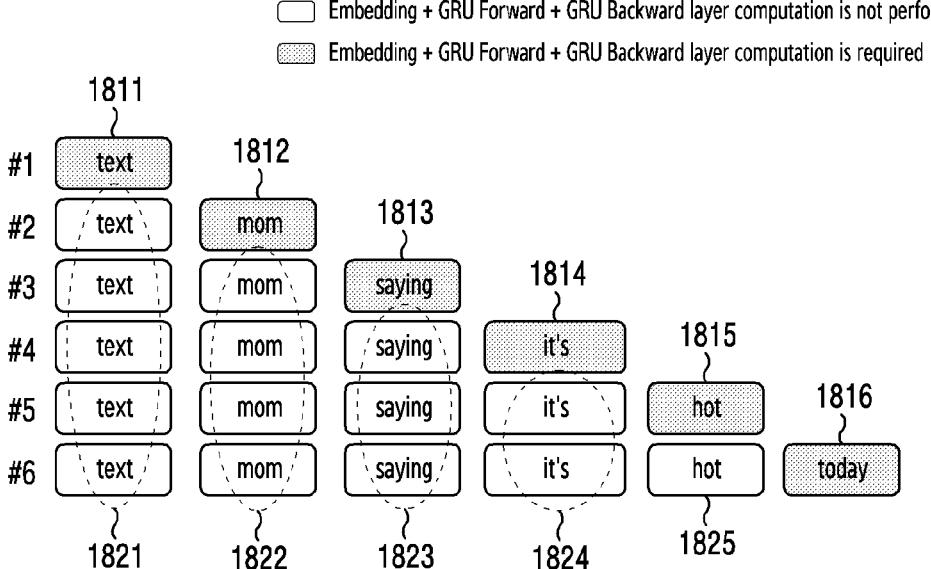
FIG. 18 is a diagram illustrating an example of an inference process after learning to cope with a real-time environment in an electronic device, according to various embodiments.

FIGS. 16, 17 and 18 are diagrams illustrating an example of an inference process after learning in order to cope with a real-time environment in an electronic device (e.g., the electronic device 101 of FIG. 1), according to various embodiments.

A deep-learning model according to an embodiment may be proposed based on RNN. The RNN is a model having advantage in sequence data processing, and is widely used in fields such as time series or a natural language. The RNN may be an example of a computation method in which information in a previous time step (hidden state) is persistently transferred to a next time step. In the RNN, when a sequence is too long, information of the previous time step may not be transferred to the next time step. This may be called a problem of long-term dependencies.

FIG. 16 illustrates a computation structure for processing a partial text recognized sequentially from an audio signal (e.g., a voice signal) on a real-time basis using automatic speech recognition in an electronic device (e.g., the electronic device 101 of FIG. 1), according to an embodiment.

Referring to FIG. 16, a computation structure according to an embodiment may have a layered structure including an input layer 1670, an embedding layer 1660, a forward layer 1650, a backward layer 1640, a dropout layer 1630, a fully connect layer 1620, and/or a prediction layer 1610. The computation structure may be, for example, a bidirectional Gated Recurrent Unit (GRU) structure.

According to an embodiment, the computation structure of FIG. 16 may perform a computation on a partial text (e.g., is) obtained from an audio signal on a real-time basis or a combination of one or more partial texts (e.g., to, day, wea, ther) previously obtained sequentially and the partial text (e.g., is) obtained on the real-time basis, and may determine whether the one or more partial texts correspond to the complete sentence or the incomplete sentence, based on a result of the computation. If it is ambiguous to determine whether the one or more partial texts correspond to the complete sentence or the incomplete sentence, based on the result of the computation, it may be predicted as an ambiguous sentence.

According to an embodiment, a computation indicated by shades in FIG. 16 may be skipped since corresponding partial texts (e.g., to, day, wea, ther) have already been subjected to the computation and a result obtained by the computation may be utilized. That is, in the forward layer 1650, a GRU computation may be performed sequentially for each of all partial texts (e.g., to, day, wea, ther, is) using an initial value (value of ht-1 is 0). In the backward layer 1640, the GRU computation shall be performed in reverse order for each of all partial texts (e.g., to, day, wea, ther, is) using the initial value (value of ht-1 is 0), but the GRU computation may be performed only for the last partial text (e.g., is) and the GRU computation may be skipped for the remaining texts (e.g., to, day, wea, ther) of which a result for the GRU computation is already known. A final computation result value in the forward layer 1650 and a GRU computation result value for the last partial text (e.g., is) in the backward layer 1640 may pass through the dropout layer 1630 and the fully connect layer 1620, and a final computation result value for the entire partial texts (e.g., to, day, wea, ther, is) may be predicted by the prediction layer 1610.

The GRU to be proposed as an embodiment in the disclosure may be a model proposed to improve the problem of long-term dependencies in the RNN. The GRU may be a model improved by further simplifying a structure of LSTM.

FIG. 17 illustrates an example structure and equation of a GRU model, according to various embodiments.

Referring to FIG. 17, the GRU model may use two gates, e.g., a reset gate $r_t$ and an update gate $Z_t$. In addition, a cell state and a hidden state may be combined to be expressed as one hidden state. The reset gate and the update gate may be obtained by an equation shown in FIG. 17. The equation for obtaining the reset gate may apply a Sigmoid activation function to a hidden state $h_{t-1}$ of a previous time point and an input $x_t$ of a current time point to obtain a hidden state $h_t$ of the current time point. A result value for the hidden state $h_t$ of the current time point may have a value in the range of 0 and 1. A value output to the reset gate $r_t$ may be applied again to a third equation instead of being directly used, and the equation may be calculated by multiplying the reset gate $r_t$ by the hidden state $h_{t-1}$ of the previous time point. The update gate $Z_t$ plays a role similar to an LSTM input, a forget gate, and may obtain a ratio of how much previous information and current information will be considered. The update gate may be obtained by utilizing first and fourth equations illustrated.

According to an embodiment, for real-time Natural Language (NL)-EPD processing, the electronic device 101 may internally include a deep-learning model (e.g., the structure of FIG. 16) designed using a bidirectional Gated Recurrent Unit (GRU) structure, that is, a bidirectional structure considering not only previous context information but also next context information.

According to an embodiment, the bidirectional GRU structure used in the electronic device 101 may be designed so that context information is recognized properly using a variety of learning data. In addition, the bidirectional GRU structure has various text metrics (accuracy, F1 score—harmonic mean, ROC curve—total performance index), and may be designed to produce an NL EPD model which is robust and excellent in generalization performance. The RNN structure may have an LSTM structure and a GRU structure in which GRU has a learning parameter size about 0.25% smaller than LSTM. In the NL-EPD learning, the GRU structure may be basically used since it seems that there is no significant difference in performance. Real-time processing is the most importance part in adaptive EPD. Therefore, when a processing speed is not satisfied even if the GRU structure is used, an inference engine is built autonomously so that a deep-learning structure is designed to improve a speed by applying three types of additional improvements as illustrated.

According to an embodiment, a partial text may have a structure in which a text is periodically transmitted and processed. In this case, a text processing module is designed independently to restrict redundant computations and unnecessary computations, thereby improving an inference speed. A solution capable of performing real-time processing may be implemented using a common deep-learning framework (Tensorflow, PyTorch) in the learning and by autonomously building an inference engine based on C++. Since a platform dependence is removed, the building of the inference engine based on C++ may have a structure usable in various frameworks (Android java—JNI C++ interface library task, Window C++—Window intel x64 build library, Tizen C++—ARM-based C++ library).

According to an embodiment, the electronic device 101 may need to be light in weight as well as to be processed on a real-time basis with a model for deep-learning. To this end, it may be designed by optimizing a layer of word embedding (a result obtained by converting a natural language used by humans into a vector which is a machine readable number) which is the most significant part in the deep-learning model (Optimizer Char Embedding (Korean, Chinese, Japanese)—embedding is configured with a text, Quantization Hybrid Embedding (English, Spanish, German, Italian)—light embedding may be configured by converting a 32-bit floating-point embedding value into an 8-bit fixed-point through quantization based on word or BPE embedding). In addition, the electronic device 101 may perform the learning and inference tasks to minimize or reduce performance deterioration when performing the quantization.

Referring to FIG. 18, computations in the embedding layer 1660, GRU forward layer 1650, and GRU backward layer 1640 may be performed on initially input partial texts 1811, 1812, 1813, 1814, 1815, and 1816. However, the partial texts 1821, 1822, 1823, 1824, 1825 on which the computations have been performed once may not be subjected to the operations in the embedding layer 1660, GRU forward layer 1650, and the GRU backward layer 1640.

For example, when a user utters 'text mom saying it's hot today', partial texts are sequentially input at each partial text generation time point of ASR, and a GRU computation may be performed on initially input partial texts 1811, 1812, 1813, 1814, 1815, and 1816. Thereafter, even if the partial texts 1811, 1812, 1813, 1814, 1815, and 1816 on which the GRU computation has been performed once are input from the ASR, the GRU computation is not performed, and a previously performed operation value is referred. Since it is designed with this structure, a processing speed may be improved. Meanwhile, when the same partial text is persistently input, the GRU computation may be performed only on a newly transferred partial text, and a previously obtained computation value may be used for the remaining partial texts. When the partial text is corrected and changed in the middle of the operation, since it is not possible to use a previous value, the GRU computation may be performed on a full text including a new partial text.

According to an example embodiment of the disclosure, an electronic device (e.g., the electronic device 101 of FIG. 1) may include: a microphone (e.g., the MIC 450 of FIG. 4) configured to convert and output a signal applied from the outside by an utterance into an electrical audio signal; a memory (e.g., the memory 430 of FIG. 4); and at least one processor (e.g., the processor 410 of FIG. 4) electrically coupled to the microphone and the memory. The memory may store instructions (e.g., the instructions 435 of FIG. 4) which, when executed, cause the at least one processor to: identify an utterance type for an input audio signal based on one or more partial texts recognized sequentially from the audio signal input from the microphone, adaptively determine a hangover time based on the identified utterance type, and detect an end of the utterance for the audio signal by applying the hangover time. The utterance type for the input audio signal may correspond to one of a complete sentence, an incomplete sentence, and an ambiguous sentence. The complete sentence may refer to a text in which an instruction instructing execution of an operation is identifiable based on natural language understanding. The incomplete sentence may refer to a text in which the instruction instructing execution of the operation is not identifiable based on the natural language understanding. The ambiguous sentence may refer to a text not classified as the complete sentence or the incomplete sentence.

According to an example embodiment of the disclosure, the memory may store the instructions which, when executed, cause the at least one processor to determine that the end of the utterance is detected based on a pause being maintained for the hangover time.

According to an example embodiment of the disclosure, the memory may store the instructions which, when executed, cause the at least one processor to decrease the hangover time upon identifying that the utterance type is the complete sentence using a speech recognition technique.

According to an example embodiment of the disclosure, the memory may store the instructions which, when executed, cause the at least one processor to increase the hangover time upon identifying that the utterance type is the incomplete sentence using the speech recognition technique.

According to an example embodiment of the disclosure, the memory may store the instructions which, when executed, cause the at least one processor to maintain the hangover time upon identifying that the utterance type is the ambiguous sentence using the speech recognition technique.

According to an example embodiment of the disclosure, the memory may store the instructions which, when executed, cause the at least one processor to process a full text recognized from the input audio signal to be output as a machine language, based on a pause being maintained until the hangover time elapses.

According to an example embodiment of the disclosure, the memory may store the instructions which, when executed, cause the at least one processor to: consider user characteristic data together with the identified utterance type to adaptively set the hangover time. The user characteristic data may include a value indicating a degree for at least one of a speech rate, a pause time between utterances, a pause count, user's gender, age, region, and emotion.

According to an example embodiment of the disclosure, the memory may store the instructions which, when executed, cause the at least one processor to accumulate the user characteristic data in the memory using a deep-learning technique.

According to an example embodiment of the disclosure, the memory may store the instructions which, when executed, cause the at least one processor to: determine whether a partial text obtained on a real-time basis from the input audio signal or a combination of one or more partial texts obtained previously and the partial text obtained on the real-time basis is the complete sentence or the incomplete sentence using a bidirectional gated recurrent unit structure, set the hangover time to be less than a reference hangover time based on the text being the complete sentence, set the hangover time to be greater than the reference hangover time based on the text being the incomplete sentence, and set the hangover time to the reference hangover time based on the text being the ambiguous sentence.

According to an example embodiment of the disclosure, the memory may store the instructions which, when executed, cause the at least one processor to: learn the complete sentence or the incomplete sentence using a deep-learning technique, and accumulate data based on the learning in the memory.

According to an example embodiment of the disclosure, a method of operating an electronic device (e.g., the electronic device 101 of FIG. 1) may include: identifying an utterance type for an input audio signal (e.g., the operation 510 of FIG. 5) based on one or more partial texts recognized sequentially from an audio signal comprising an electrical signal converted from a signal applied from the outside by an utterance; adaptively determining a hangover time based on the identified utterance type (e.g., the operation 520 of FIG. 5); and detecting an end of the utterance for the audio signal by applying the hangover time (e.g., the operation 530 of FIG. 5). The utterance type for the input audio signal may correspond to one of a complete sentence, an incomplete sentence, and an ambiguous sentence. The complete sentence may be a text in which an instruction instructing execution of an operation is identifiable based on natural language understanding. The incomplete sentence may be a text in which the instruction instructing execution of the operation is not identifiable based on the natural language understanding. The ambiguous sentence may be a text not classified as the complete sentence or the incomplete sentence.

According to an example embodiment of the disclosure, the operation of detecting the end of the utterance may include determining that the end of the utterance is detected based on a pause being maintained for the hangover time.

According to an example embodiment of the disclosure, adaptively determining the hangover time may include decreasing the hangover time upon identifying that the utterance type is the complete sentence using a speech recognition technique.

According to an example embodiment of the disclosure, adaptively determining the hangover time may further include increasing the hangover time upon identifying that the utterance type is the incomplete sentence using the speech recognition technique.

According to an example embodiment of the disclosure, adaptively determining the hangover time may further include maintaining the hangover time upon identifying that the utterance type is the ambiguous sentence using the speech recognition technique.

According to an example embodiment of the disclosure, the method may further include processing a full text recognized from the input audio signal to be output as a machine language, based on a pause being maintained until the hangover time elapses.

According to an example embodiment of the disclosure, the method may further include adaptively setting the hangover time considering user characteristic data together with the identified utterance type. The user characteristic data may include a value indicating a degree for at least one of a speech rate, a pause time between utterances, a pause count, user's gender, age, region, and emotion.

According to an example embodiment of the disclosure, the method may further include accumulating the user characteristic data in the memory using a deep-learning technique.

According to an example embodiment of the disclosure, identifying the utterance type may include determining whether a partial text obtained on a real-time basis from the input audio signal or a combination of one or more partial texts obtained previously and the partial text obtained on the real-time basis is the complete sentence or the incomplete sentence using a bidirectional gated recurrent unit structure. The adaptively determining the hangover time may include: setting the hangover time to be less than a reference hangover time based on the text being the complete sentence; setting the hangover time to be greater than the reference hangover time based on the text being the incomplete sentence; and setting the hangover time to the reference hangover time based on the text being the ambiguous sentence.

According to an example embodiment of the disclosure, the method may further include learning the complete sentence or the incomplete sentence using a deep-learning technique, and accumulating data based on the learning in the memory.

Methods based on the embodiments disclosed in the claims and/or the disclosure may be implemented in hardware, software, or a combination of both.

When implemented in software, computer readable recording medium for storing one or more programs (e.g., software modules) may be provided. The one or more programs stored in the computer readable recording medium are configured for execution performed by one or more processors in the electronic device. The one or more programs may include instructions for allowing the electronic device to execute the methods based on the embodiments disclosed in the claims and/or the disclosure.

The program (e.g., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have an access to a device for performing an embodiment of the disclosure via an external port. In addition, an additional storage device on a communication network may have an access to the device for performing the embodiment of the disclosure.

The scope of protection is defined by the appended claims. Additional features are specified by the appended dependent claims. Example implementations may be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations may be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been illustrated and described with reference to various example embodiments thereof, it will be understood that the various example embodiments are intended to be illustrative, not limiting. It will be further understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. An electronic device comprising:
   a microphone configured to convert and output a signal applied from the outside by an utterance into an electrical audio signal;
   memory storing instructions; and
   at least one processor electrically coupled to the microphone and the memory,
   wherein the instructions, when executed by the at least one processor individually or collectively, cause the electronic device to:

identify an utterance type for an input audio signal based on one or more partial texts recognized sequentially from the audio signal input from the microphone;

adaptively determine a hangover time based on the identified utterance type; and detect an end of the utterance for the audio signal by applying the hangover time, wherein the utterance type for the input audio signal corresponds to one of a complete sentence, an incomplete sentence, and an ambiguous sentence, wherein the complete sentence is a text in which an instruction instructing execution of an operation is identifiable based on natural language understanding, and the hangover time is set to be less than a reference hangover time when the identified utterance type corresponds to the complete sentence, wherein the incomplete sentence is a text in which the instruction instructing execution of the operation is not identifiable based on the natural language understanding, and the hangover time is set to be greater than the reference hangover time when the identified utterance type corresponds to the incomplete sentence, and wherein the ambiguous sentence is a text not classified as the complete sentence or the incomplete sentence, and the hangover time is set to be the reference hangover time when the identified utterance type corresponds to the ambiguous sentence.

2. The electronic device of claim 1, wherein the instructions, when executed by the at least one processor individually or collectively, cause the electronic device to determine that the end of the utterance is detected based on a pause being maintained for the hangover time.

3. The electronic device of claim 1, wherein the instructions, when executed by the at least one processor individually or collectively, cause the electronic device to at least one processor to decrease the hangover time by a degree corresponding to a speech rate of the audio signal upon identifying that the utterance type is the complete sentence using a speech recognition technique.

4. The electronic device of claim 1, wherein the instructions, when executed by the at least one processor individually or collectively, cause the electronic device to increase the hangover time by a degree corresponding to a speech rate of the audio signal upon identifying that the utterance type is the incomplete sentence using a speech recognition technique.

5. The electronic device of claim 4, wherein the instructions, when executed by the at least one processor individually or collectively, cause the electronic device to maintain the hangover time upon identifying that the utterance type is the ambiguous sentence using a speech recognition technique.

6. The electronic device of claim 1, wherein the instructions, when executed by the at least one processor individually or collectively, cause the electronic device to process a full text recognized from the input audio signal to be output as a machine language, based on a pause being maintained until the hangover time elapses.

7. The electronic device of claim 1, wherein the instructions, when executed by the at least one processor individually or collectively, cause the electronic device to consider characteristic data together with the identified utterance type to adaptively set the hangover time, wherein the characteristic data is a value indicating a degree for at least one of a speech rate, a pause time between utterances, a pause count, gender, age, region, and emotion.

8. The electronic device of claim 7, wherein the instructions, when executed by the at least one processor individually or collectively, cause the electronic device to accumulate the characteristic data in the memory using a deep-learning technique.

9. The electronic device of claim 1, wherein the instructions, when executed by the at least one processor individually or collectively, cause the electronic device to:

determine whether a partial text obtained on a real-time basis from the input audio signal or a combination of one or more partial texts obtained previously and the partial text obtained on the real-time basis is the complete sentence or the incomplete sentence using a bidirectional gated recurrent unit structure.

10. The electronic device of claim 9, wherein the instructions, when executed by the at least one processor individually or collectively, cause the electronic device to: learn the complete sentence or the incomplete sentence using a deep-learning technique, and accumulate data based on the learning in the memory.

11. A method of operating an electronic device, the method comprising:

identifying an utterance type for an input audio signal, based on one or more partial texts recognized sequentially from an audio signal comprising an electrical signal converted from a signal applied from the outside by an utterance;

adaptively determining a hangover time based on the identified utterance type; and detecting an end of the utterance for the audio signal by applying the hangover time, wherein the utterance type for the input audio signal corresponds to one of a complete sentence, an incomplete sentence, and an ambiguous sentence, wherein the complete sentence is a text in which an instruction instructing execution of an operation is identifiable based on natural language understanding and the hangover time is set to be less than a reference hangover time when the identified utterance type corresponds to the complete sentence, wherein the incomplete sentence is a text in which the instruction instructing execution of the operation is not identifiable based on the natural language understanding and the hangover time is set to be greater than the reference hangover time when the identified utterance type corresponds to the incomplete sentence, and wherein the ambiguous sentence is a text not classified as the complete sentence or the incomplete sentence, and the hangover time is set to be the reference hangover time when the identified utterance type corresponds to the ambiguous sentence.

12. The method of claim 11, wherein the detecting of the end of the utterance includes determining that the end of the utterance is detected based on a pause being maintained for the hangover time.

13. The method of claim 11, wherein the adaptively determining of the hangover time comprises decreasing the hangover time by a degree corresponding to a speech rate of the audio signal upon identifying that the utterance type is the complete sentence using a speech recognition technique.

14. The method of claim 11, wherein the adaptively determining of the hangover time comprises increasing the hangover time by a degree corresponding to a speech rate of the audio signal upon identifying that the utterance type is the incomplete sentence using a speech recognition technique.

15. The method of claim 11, wherein the adaptively determining of the hangover time comprises maintaining the hangover time upon identifying that the utterance type is the ambiguous sentence using a speech recognition technique.

16. The method of claim 11, further comprising processing a full text recognized from the input audio signal to be output as a machine language, based on a pause being maintained until the hangover time elapses.

17. The method of claim 11, further comprising adaptively setting the hangover time by considering characteristic data together with the identified utterance type, wherein the characteristic data is a value indicating a degree for at least one of a speech rate, a pause time between utterances, a pause count, gender, age, region, and emotion.

18. The method of claim 17, further comprising accumulating the characteristic data in memory using a deep-learning technique.

19. The method of claim 11,
  wherein the identifying of the utterance type comprises
    determining whether a partial text obtained on a real-time basis from the input audio signal or a combination of one or more partial texts obtained previously and the partial text obtained on the real-time basis is the complete sentence or the incomplete sentence using a bidirectional gated recurrent unit structure.

20. The method of claim 19, further comprising learning the complete sentence or the incomplete sentence using a deep-learning technique, and accumulating data based on the learning in memory.

* * * * *